United States Patent
Zacharias et al.

(10) Patent No.: US 12,207,339 B2
(45) Date of Patent: Jan. 21, 2025

(54) RADIO RESOURCE CONTROL (RRC) CONNECTION RELEASE TIMER

(71) Applicant: QUALCOMM Incorporated, San Diego, CA (US)

(72) Inventors: Leena Zacharias, San Jose, CA (US); Arnaud Meylan, San Diego, CA (US); Arvind Vardarajan Santhanam, San Diego, CA (US); Ling Xie, Beijing (CN); Subashini Krishnamurthy, San Diego, CA (US); Arun Prasanth Balasubramanian, San Diego, CA (US); Sundaresan Tambaram Kailasam, San Diego, CA (US); Vaishakh Rao, San Diego, CA (US); Vishal Dalmiya, San Diego, CA (US); Prakriti Gupta, Mountain View, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/753,546

(22) PCT Filed: Sep. 29, 2019

(86) PCT No.: PCT/CN2019/108986
§ 371 (c)(1),
(2) Date: Mar. 7, 2022

(87) PCT Pub. No.: WO2021/056524
PCT Pub. Date: Apr. 1, 2021

(65) Prior Publication Data
US 2022/0338302 A1    Oct. 20, 2022

(51) Int. Cl.
*H04W 76/38* (2018.01)
*H04W 52/02* (2009.01)
(Continued)

(52) U.S. Cl.
CPC ....... *H04W 76/38* (2018.02); *H04W 52/0216* (2013.01); *H04W 76/18* (2018.02); *H04W 76/27* (2018.02); *H04W 76/28* (2018.02)

(58) Field of Classification Search
CPC . H04W 76/38; H04W 52/0216; H04W 76/18; H04W 76/27; H04W 76/28; Y02D 30/70
See application file for complete search history.

(56) References Cited

U.S. PATENT DOCUMENTS 10,051,568 B2   8/2018  Alon et al.
10,079,657 B2   9/2018  Balasubramanian et al.
(Continued)

FOREIGN PATENT DOCUMENTS

CN    104811982 A   7/2015
EP      3448114 A1   2/2019
(Continued)

OTHER PUBLICATIONS

Supplementary European Search Report—EP19946617—Search Authority—The Hague—May 17, 2023.
(Continued)

*Primary Examiner* — Ricky Q Ngo
*Assistant Examiner* — Kabir U Jahangir
(74) *Attorney, Agent, or Firm* — QUALCOMM Incorporated

(57) ABSTRACT

Certain aspects of the present disclosure provide techniques for releasing an RRC connection by a user equipment (UE). A method that may be performed by the UE includes establishing an RRC connection, determining a time dura-
(Continued)

tion for a release timer, resetting the release timer, monitoring the RRC connection, and releasing the RRC connection.

33 Claims, 12 Drawing Sheets

(51) Int. Cl.
*H04W 76/18* (2018.01)
*H04W 76/27* (2018.01)
*H04W 76/28* (2018.01)

(56) References Cited

U.S. PATENT DOCUMENTS

| | | | | |
|---|---|---|---|---|
| 2013/0260740 | A1* | 10/2013 | Rayavarapu | H04W 76/27 |
| | | | | 455/422.1 |
| 2013/0315119 | A1 | 11/2013 | Tabet et al. | |
| 2013/0329637 | A1* | 12/2013 | Kodali | H04W 76/27 |
| | | | | 370/328 |
| 2014/0321371 | A1* | 10/2014 | Anderson | H04W 72/23 |
| | | | | 370/329 |
| 2016/0286486 | A1* | 9/2016 | Nobusawa | H04W 72/23 |
| 2017/0318536 | A1* | 11/2017 | Manepalli | H04W 24/02 |
| 2018/0220485 | A1* | 8/2018 | Su | H04W 76/27 |
| 2019/0021052 | A1* | 1/2019 | Kadiri | H04L 5/0098 |
| 2020/0322854 | A1* | 10/2020 | Ryoo | H04W 36/0058 |
| 2021/0037592 | A1* | 2/2021 | Lee | H04W 74/0833 |

FOREIGN PATENT DOCUMENTS

| | | |
|---|---|---|
| WO | 2017074541 | 5/2017 |
| WO | 2017106006 | 6/2017 |
| WO | 2018175199 A1 | 9/2018 |

OTHER PUBLICATIONS

Ericsson: "Quick RRC Connection Release", 3GPP TSG-RAN2 Meeting #99, R2-1708279, Aug. 25, 2017 (Aug. 25, 2017), 10 pages, the whole document.
Ericsson: "Quick RRC Connection Release", 3GPP TSG-RAN2 Meeting #99bis, R2-1710735, Oct. 13, 2017 (Oct. 13, 2017), 10 pages, the whole document.
International Search Report and Written Opinion—PCT/CN2019/108986—ISA/EPO—Jun. 29, 2020.
Taiwan Search Report—TW109133418—TIPO—Mar. 11, 2024.

* cited by examiner

RADIO RESOURCE CONTROL (RRC) CONNECTION RELEASE TIMER

CROSS-REFERENCE TO RELATED APPLICATIONS

This application is a national stage application under 35 U.S.C. 371 of PCT/CN2019/108986, filed Sep. 29, 2019, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for releasing, by a user equipment (UE) an RRC connection.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved methods of communication, including methods that provide for a user equipment (UE) to unilaterally release a communication link, such as a radio resource control (RRC) link between the UE and a base station (BS). Such methods reduce power consumption of UEs by decreasing the amount of time the UE remains in a connected state with the BS.

Certain aspects provide a method of releasing a radio resource control (RRC) connection by a user equipment (UE), comprising: establishing an RRC connection comprising: (i) a first connection between the UE and a first base station (BS), and (ii) a second connection between the UE and a second BS, determining a time duration for a release timer, wherein the time duration is based on whether the UE is configured with one or more of a first connected mode discontinuous reception (CDRX) configuration for the first connection or a second CDRX configuration for the second connection, resetting the release timer after receiving downlink data or transmitting uplink data via at least one of the first connection or the second connection, monitoring the first connection and the second connection for an opportunity to receive additional downlink data or an opportunity to transmit additional uplink data for the time duration after the resetting, and releasing the RRC connection if no opportunity to receive additional downlink data and no opportunity to transmit additional uplink data is detected over one or more of the first connection or the second connection for the time duration after the resetting.

Certain aspects provide a method of releasing a radio resource control (RRC) connection by a user equipment (UE), comprising establishing an RRC connection between the UE and a base station (BS), determining a time duration for a release timer, wherein the time duration is based on a cycle length of a connected mode discontinuous reception (CDRX) configuration of the RRC connection, resetting the release timer after receiving downlink data or transmitting uplink data via the RRC connection, monitoring the RRC connection for an opportunity to receive additional downlink data or an opportunity to transmit additional uplink data for the time duration after the resetting, and releasing the RRC connection if no opportunity to receive additional downlink data and no opportunity to transmit additional uplink data is detected over the RRC connection for the time duration after the resetting.

Certain aspects provide a method of releasing a connection in a dual connectivity network, comprising establishing an RRC connection comprising: (i) a first connection between the UE and a first base station (BS), and (ii) a second connection between the UE and a second BS, determining a time duration for a release timer, resetting the release timer after receiving downlink data or transmitting uplink data via at least one of the first connection or the second connection, monitoring the first connection and the second connection for an opportunity to receive additional downlink data or an opportunity to transmit additional uplink data for the time duration after the resetting, and releasing one or more of the first connection or the second connection if no opportunity to receive additional downlink data and no opportunity to transmit additional uplink data is detected over one or more of the first connection or the second connection for the time duration after the resetting, wherein releasing one or more of the first connection or the second connection upon expiration of the time duration comprises releasing the second connection only if no data is transmitted to the UE and no data is transmitted by the UE over the second connection during the time duration after the resetting.

Certain aspects provide a method of releasing a radio resource control (RRC) connection by a user equipment (UE), comprising, establishing a RRC connection between the UE and a base station (BS), determining a time duration for a release timer, wherein the time duration is based on a pattern of application layer data traffic over the RRC connection, resetting the release timer after receiving downlink data or transmitting uplink data via the RRC connection, monitoring the RRC connection for an opportunity to receive additional downlink data or an opportunity to transmit additional uplink data for the time duration after the resetting, and releasing the RRC connection if no opportunity to receive additional downlink data and no opportunity to transmit additional uplink data is detected over the RRC connection for the time duration after the resetting.

Certain aspects provide a method of releasing a radio resource control (RRC) connection by a user equipment (UE), comprising, establishing a RRC connection between the UE and a base station (BS), determining a time duration for a release timer, resetting the release timer after receiving downlink data or transmitting uplink data via the RRC connection, monitoring the RRC connection for an opportunity to receive additional downlink data or an opportunity to transmit additional uplink data for the time duration after the resetting, and releasing the RRC connection if no opportunity to receive additional downlink data and no opportunity to transmit additional uplink data is detected over the RRC connection for the time duration after the resetting, wherein releasing the RRC connection comprises, transmitting a tracking area update (TAU) message to the BS, wherein the TAU message is configured to trigger the BS to release the UE from the RRC connection in response to the TAU message, determining that the BS has not responded to the TAU message, refraining from releasing the RRC connection in response to the determination that the BS has not responded to the TAU message.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for methods that provide for a user equipment (UE) to unilaterally release a communication link, such as a radio resource control (RRC) link between the UE and a base station (BS). Such methods reduce power consumption of UEs by decreasing the amount of time the UE remains in a connected state with the B S.

The following description provides examples for using an RRC connection release timer by a UE to control RRC connections, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G new radio (NR) RAT network may be deployed.

Figure 1:
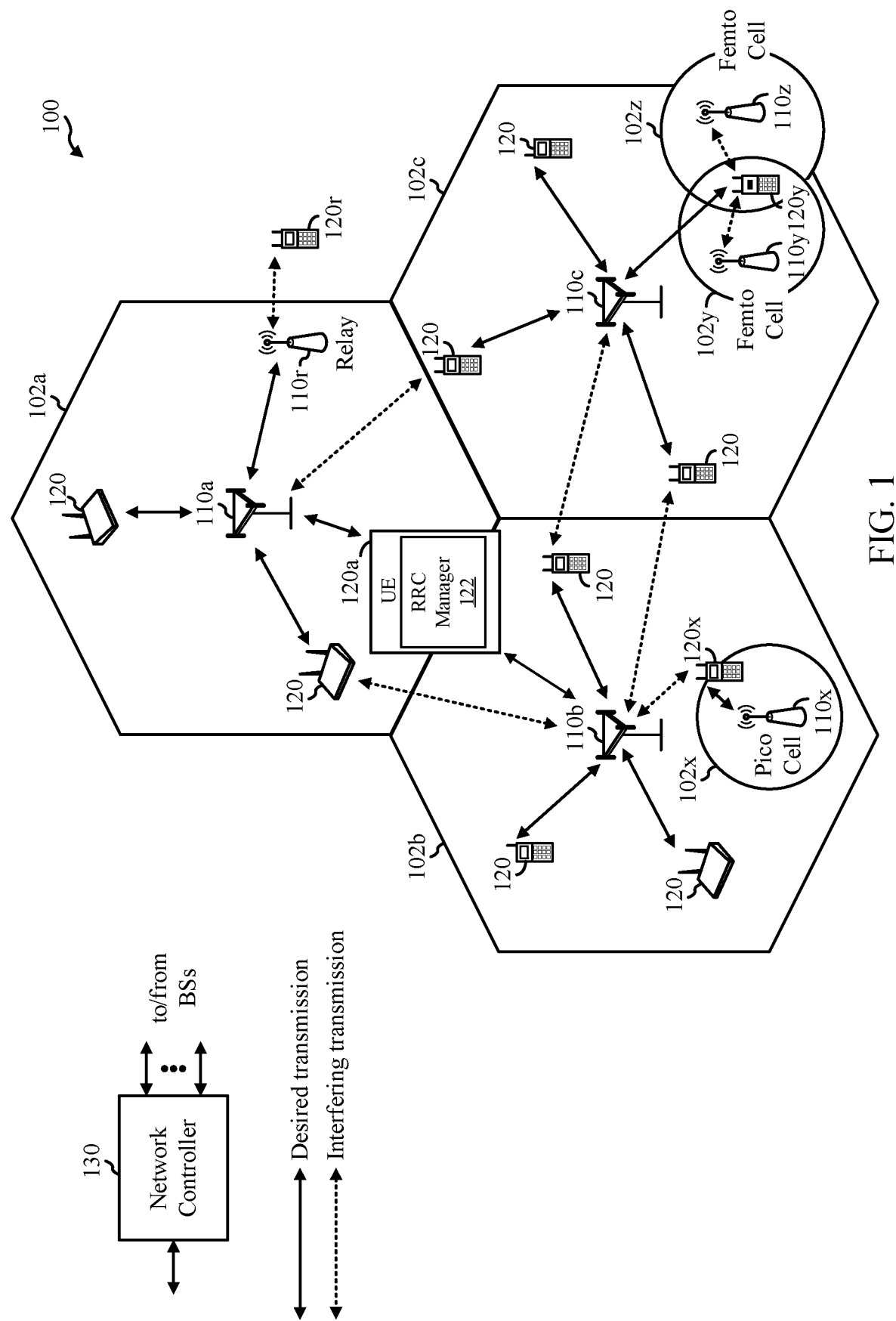
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

With the deployment of 5G, a UE (e.g., UE 120a) may have dual connectivity functionality. In some examples, UEs will have the capacity to simultaneously communicate with a first BS (e.g., BS 110a) and a second BS (e.g., BS 110b), wherein the first BS 110a and the second BS 110b are configured with different RATs. For instance, UE 120a may simultaneously communicate with the first BS 110a utilizing a long term evolution (LTE) RAT (e.g., a communication with an evolved node B (eNB)) and the second BS 110b utilizing a 5G NR RAT (e.g., a communication with a next generation node B (gNB)).

According to certain aspects, the UEs 120 may be configured for releasing an RRC connection. As shown in FIG. 1, the UE 120a includes an RRC manager 122. The RRC manager 122 may be configured to establish an RRC connection, determine a time duration for a release timer, reset the release timer, monitor the RRC connection, and release the RRC connection, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
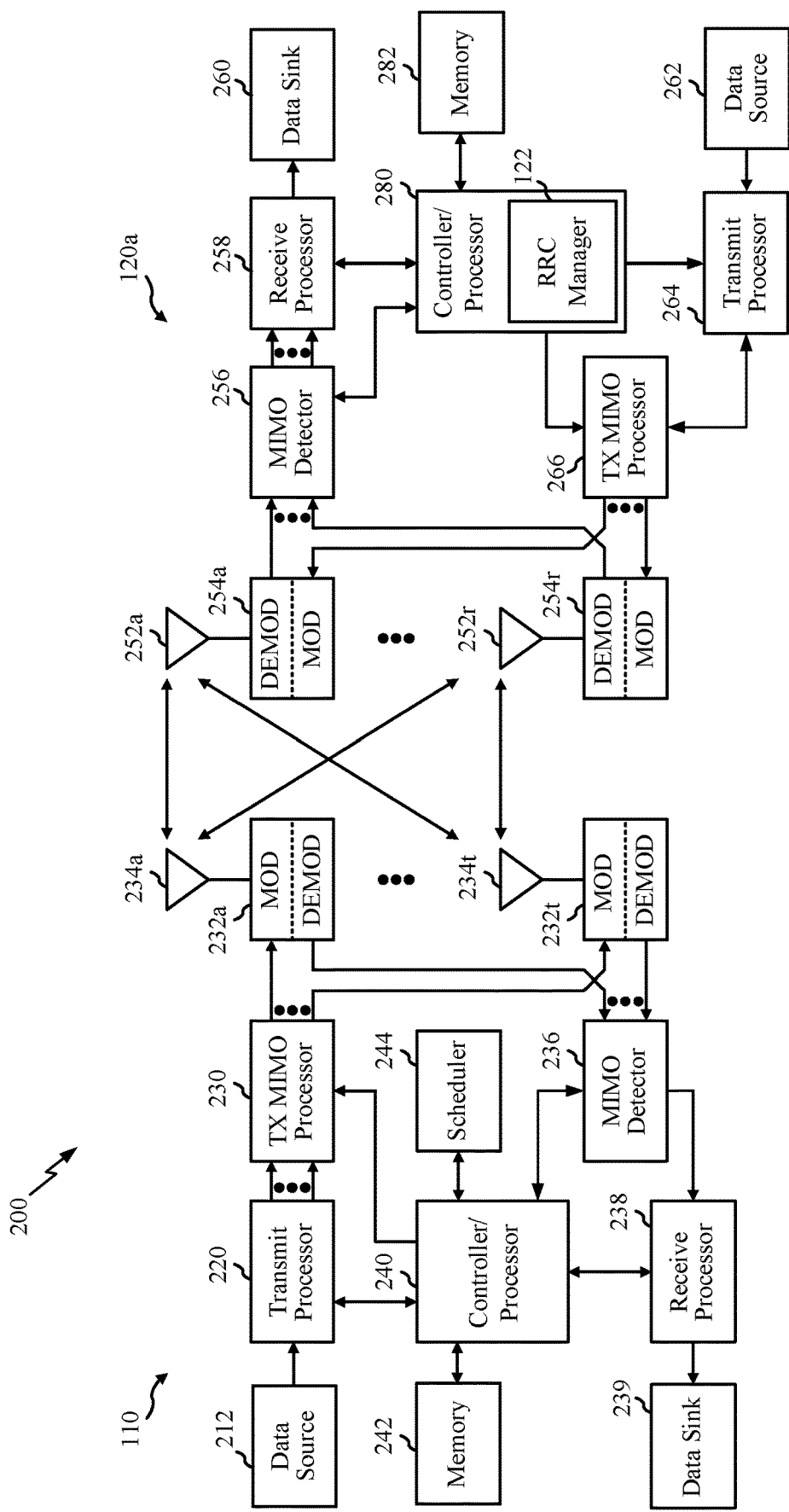
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, down-convert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. As shown in FIG. 2, the controller/processor 280 of the UE 120*a* has an RRC manager 122 that may be configured for establishing an RRC connection, determining a time duration for a release timer, resetting the release timer, monitoring the RRC connection, and releasing the RRC connection, according to aspects described herein. Although shown at the Controller/Processor, other components of the UE 120*a* and BS 110*a* may be used performing the operations described herein.

Figure 3:
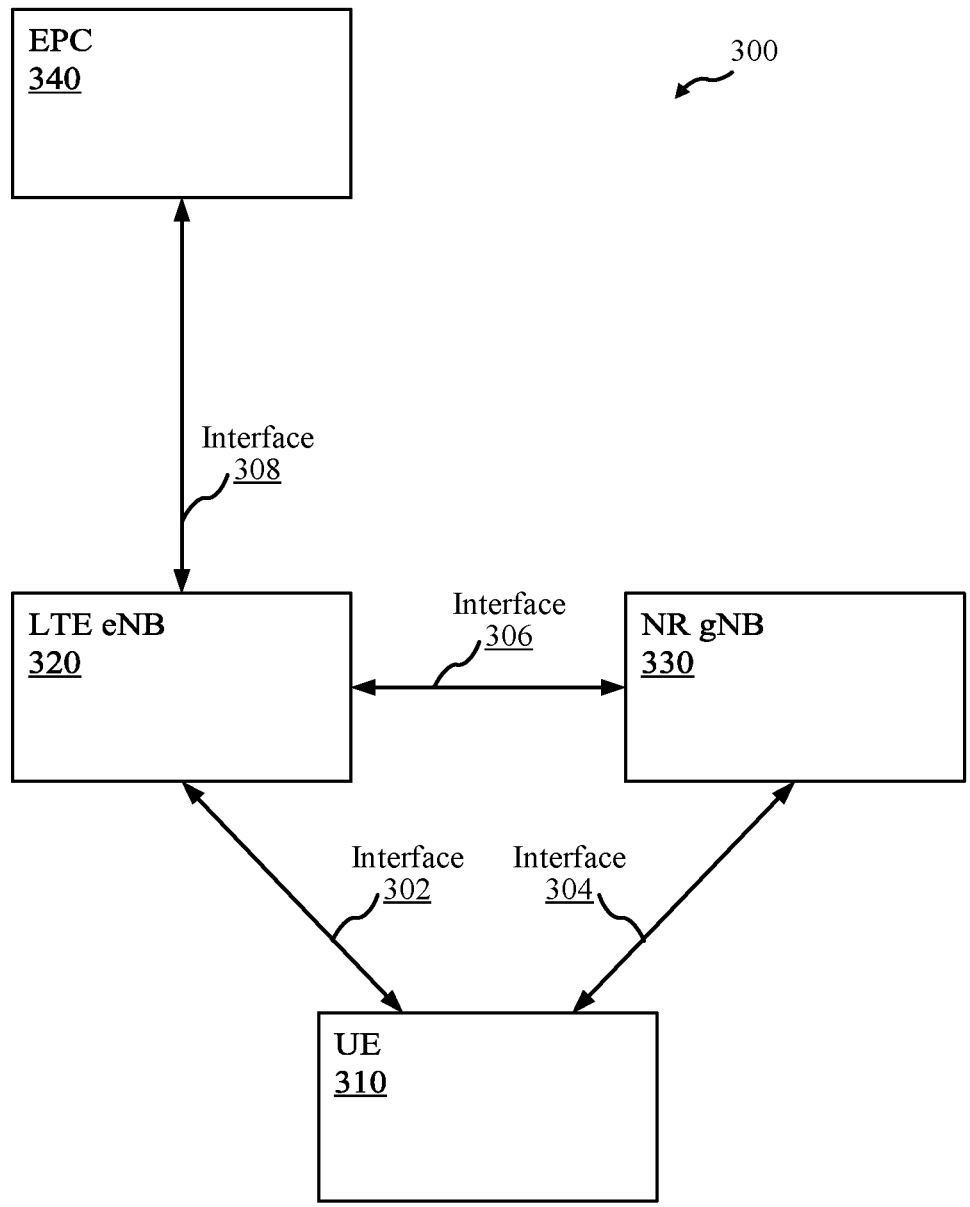
FIG. 3 is a block diagram illustrating an example system for dual connectivity between 5G new radio (NR) and long-term evolution (LTE), in accordance with certain aspects of the present disclosure.

FIG. 3 is a block diagram illustrating an example system architecture 300 for dual connectivity between 5G NR and E-UTRAN (EN-DC), in accordance with certain aspects of the present disclosure. As previously stated, with deployment of 5G, a UE 310 (e.g., UE 120*a* of FIG. 1) may have dual connectivity functionality allowing the UE 310 to simultaneously communicate with a first BS 320 (e.g., BS 110*a* of FIG. 1) utilizing an LTE RAT (e.g., a communication with an evolved BS (eNB)) and a second BS 330 (e.g., BS 110*b* of FIG. 1) utilizing a 5G NR RAT (e.g., a communication with a next generation BS (gNB)).

The UE 310 is configured to engage in a dual connectivity communication with the first BS 310 via interface 302 (e.g., a wireless interface) and the second BS 330 via interface 304 (e.g., a wireless interface). Here, the first BS 320 and the second BS 330 may be connected to one another via interface 306 (e.g., an X2 interface), as shown, and that the first BS 320 may connect to an evolved packet core (EPC) 340 via interface 308 (e.g., an S1 interface), wherein interface 308 connects to a mobile management entity (MME) (control plane) and to a system architecture evolution (SAE) gateway (S-GW) (user plane).

Figure 4:
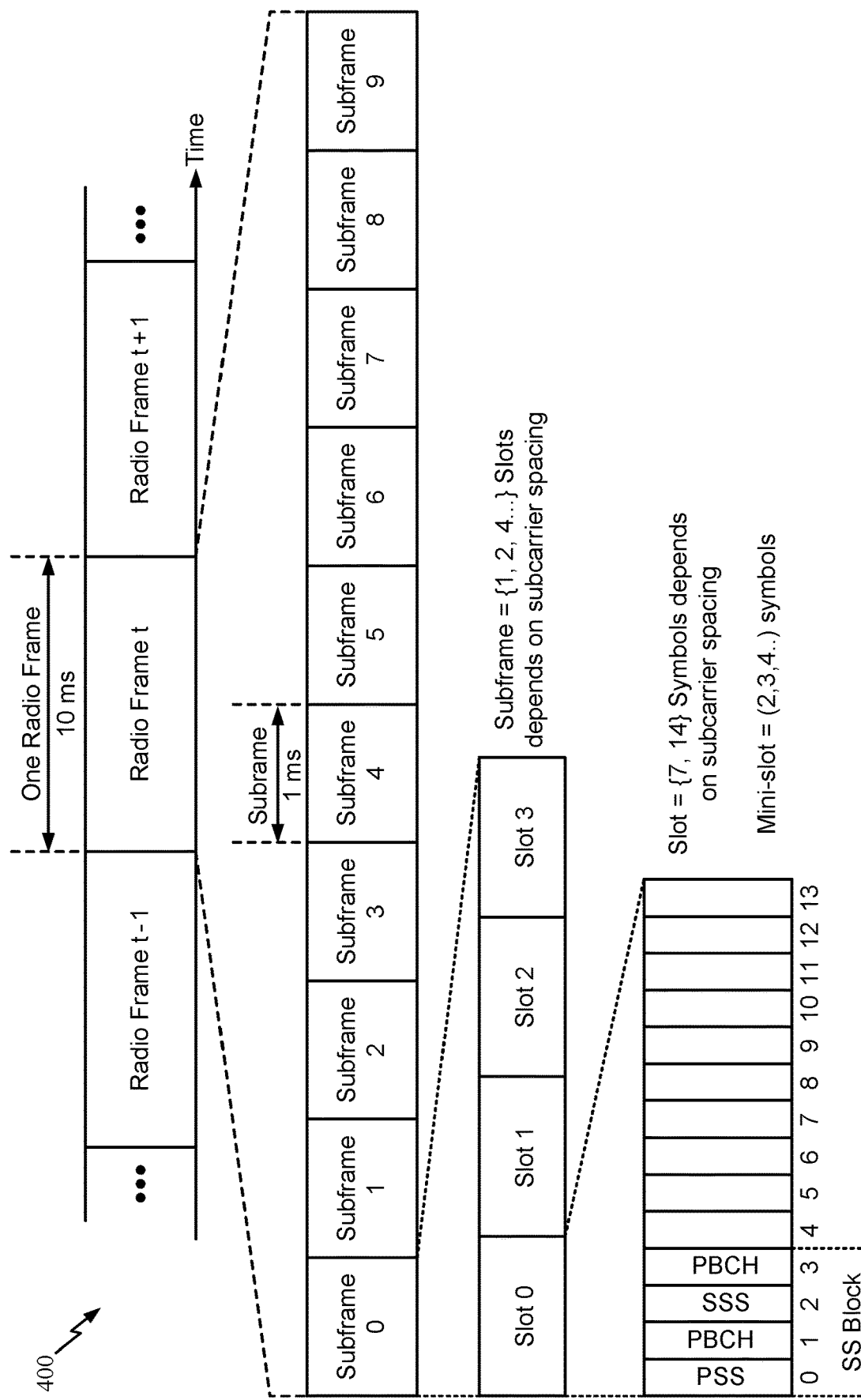
FIG. 4 is a diagram showing an example of a frame format for NR, in accordance with certain aspects of the present disclosure.

FIG. 4 is a diagram showing an example of a frame format 400 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a sub-slot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 4. The PSS and SSS may be used by a UE (e.g., UE 120*a* of FIG. 1) for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE 120*a* may operate in various radio resource configurations, including a radio resource control (RRC) state. When operating in the RRC state, the UE 120*a* may select a dedicated set of resources for transmitting a pilot signal to a network. The UE 120*a* may be in one of a plurality of RRC operating states. One of the states may be referred to as an RRC_IDLE state. In the RRC_IDLE state, the UE 120*a* may not have an active connection to a BS (e.g., BS 110*a* of FIG. 1), and the BS 110*a* does not have a context for the UE 120*a*. Hence, data transfer between the UE 120*a* and the BS 100*a* is not possible.

Another of the operating states may be an inactive state that represents a middle ground between a connected state and an idle state. In the inactive state, the BS 110*a* has a UE 120*a* context, but no active connection between the UE 120*a* and the BS 110*a*. The inactive state may be referred to as "RRC_COMMON," "RRC_INACTIVE," "RRC_DORMANT," or as an "inactive state in RRC_CONNECTED mode" and such terms are used interchangeably herein. In the inactive state, the UE 120*a* does not have any dedicated resources (e.g., time and frequency resources for the UE 120*a* to transmit on that other UEs 120 are not also transmitting on, time and frequency resources for signals that only the UE 120*a* is intended to receive). The UE 120*a* may monitor a paging channel with a long discontinuous reception (DRX) cycle (e.g., around 320 ms to 2560 ms).

Another of the operating states may be an active state. In the active state, the BS 110*a* has a UE context, and there is an active connection between the UE 120*a* and the BS 110*a*. In the active state, the UE may have dedicated resources for transmissions to or from the BS and other devices. The active state may be referred to as "RRC_CONNECTED mode," "RRC_CONNECTED active state," "RRC_DEDICATED," "RRC_ACTIVE," or "active state in RRC_CONNECTED mode" and such terms are used interchangeably herein. When the BS 110*a* obtains information that the BS 110*a* should set up an RRC connection with dedicated resources for the UE 120*a* (e.g., the BS 110*a* receives an RRC connection resume request message from the UE 120*a*, the BS 110*a* obtains data to be transmitted to the UE 120*a*), then the BS 110*a* may send a transmission (e.g., a page) to the UE 120*a* to cause the UE 120*a* to transition to the active state. When the BS 110*a* acknowledges the RRC connection resume request message, then the UE 120*a* may enter the active state.

In certain aspects, the UE 120*a* may be configured to operate in what is known as connected mode DRX (CDRX). The purpose of CDRX is the same as DRX in RRC idle and inactive states, which is to conserve battery power in the UE 120*a*, but also allow DRX during an RRC connected state. For example, within a cycle of the CDRX mode, the UE 120*a* may be in an active state for a period of time to monitor a physical downlink control channel (PDCCH) and/or a physical downlink shared channel (PDSCH). Within the same cycle of CDRX mode, the UE may sleep for a period of time to conserve power.

In response to the UE 120*a* receiving any downlink data from the network during the active state, the UE 120*a* may abandon the CDRX mode and continuously monitor the PDCCH for downlink data (e.g., continuous reception). Otherwise, the UE 120*a* may sleep in the off-duration period to avoid power consumption. Additionally, during an RRC connected state when there is no data transmission in either direction (i.e., uplink UL or downlink DL), the UE 120*a* may be configured to enter into the CDRX mode to start discontinuously monitoring the PDCCH.

In certain aspects of wireless communication, cells may require that the UE 120*a* remain in an active state for a relatively long time (e.g., relatively long RRC inactivity timer), or the cells may not configure the UE 120*a* for CDRX. In such cases, the UE 120*a* may remain in an active state for a relatively long period of time despite having no communication between the UE 120*a* and BS 110*a*. In such cases, the active state may cause the UE 120*a* to lose power.

Example of a UE Releasing a Radio Resource Control (RRC) Connection in an E-UTRAN New Radio—Dual Connectivity (EN-DC) Network Aspects of the present disclosure provide methods allowing a UE (e.g., UE 120*a* of FIG. 1) to release or drop an RRC connection with an EN-DC network so that the UE can conserve power that would otherwise be drained if the UE remained in a connected state.

Figure 5:
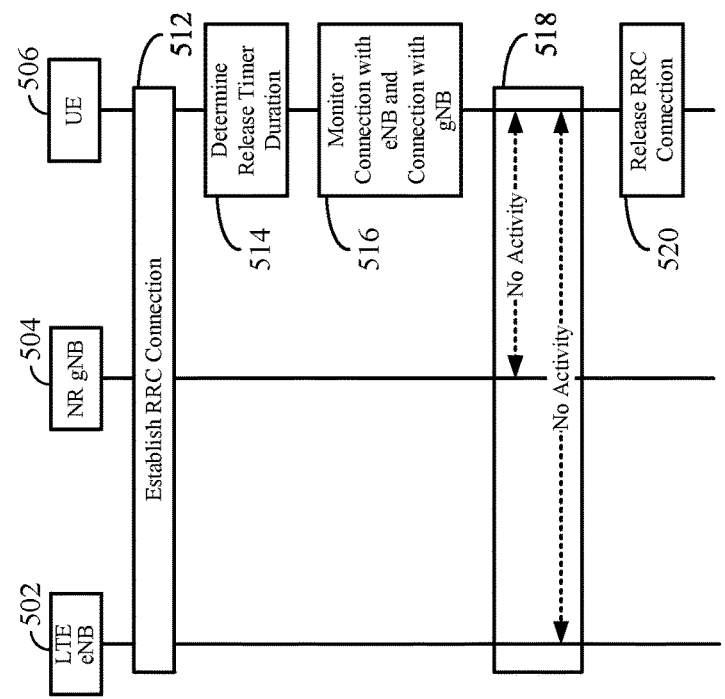
FIG. 5 includes a diagram and a call-flow diagram illustrating an example method for releasing a radio resource control (RRC) connection within an dual-connectivity network, in accordance with certain aspects of the present disclosure.
Figure 5:
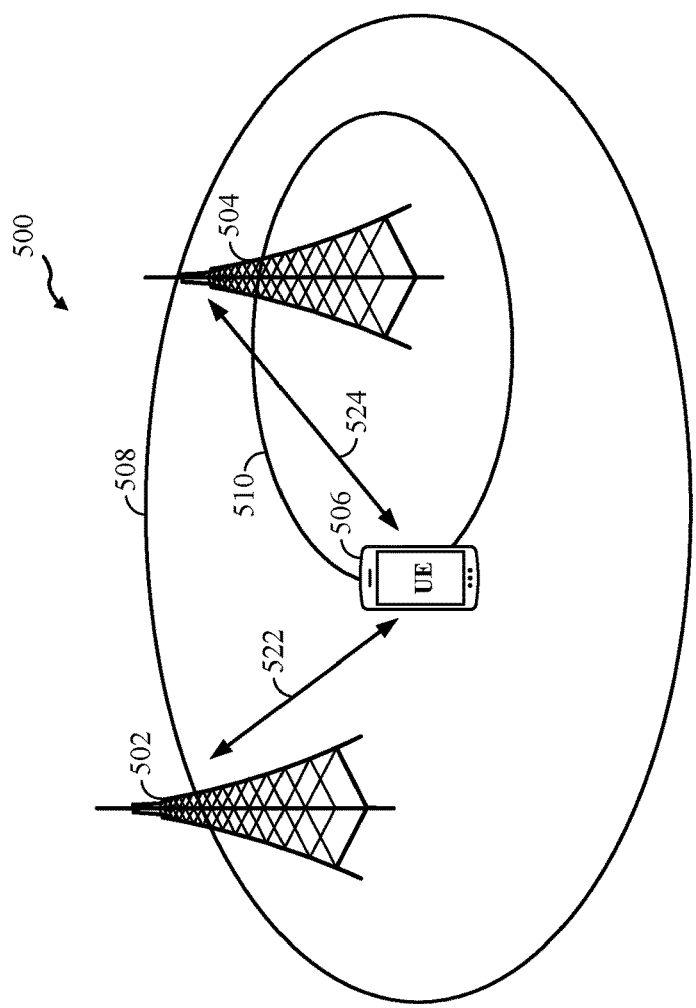

FIG. 5 includes a diagram and a call-flow diagram illustrating an example method for releasing an RRC connection within an EN-DC network 500, according to certain aspects. In this example, the EN-DC network 500 includes a first BS 502 (e.g., BS 110*a* of FIG. 1) utilizing an LTE RAT (e.g., evolved BS (eNB)) for communication within an LTE cell 508. The EN-DC network 500 also includes a second BS 504 (e.g., BS 110*b* of FIG. 1) utilizing a 5G NR RAT (e.g., next generation BS (gNB)) for communication within a NR 5G cell 510. Within the EN-DC network 500, a UE 506 is configured to communicate with both the first BS 502 and the second BS 504. In this example, the first BS 502 may be configured to operate as a "master" cell group (MCG), whereas the second BS 504 may be configured to operate as a "secondary" cell group (SCG). In such a configuration, the RRC is located in the MCG. As such, communication within the EN-DC network 500 relies on a single RRC connection that terminates at the MCG. It should be noted that other configurations are also within the scope of this disclosure, for example, a configuration wherein the RRC is located in the SgNB, and/or wherein the first BS 502 utilizes the 5G NR RAT and the second BS 504 utilizes the LTE RAT, or wherein each of the first BS 502 and the second BS 504 utilize one of the 5G NR RAT or the LTE RAT.

In a first step 512, the UE 506 establishes an RRC connection between the first BS 502 and the second BS 504. In one example, the UE 506 performs an RRC connection process to establish an RRC connection with the first BS 502, wherein the RRC connection includes: (i) a first connection 522 between the UE 506 and the first BS 502, and (ii) a second connection 524 between the UE 506 and the second BS 504. Here, the UE 506 is able to exchange data between itself and both the first BS 502 (e.g., the LTE RAT) and the second BS 504 (e.g., the 5G NR RAT) simultaneously.

In a second step 514, the UE 506 determines a time duration for a release timer, wherein the time duration is based on whether the UE 506 is configured with one or more of a first connected mode discontinuous reception (CDRX) configuration for the first connection 522 or a second CDRX configuration for the second connection 524. In certain aspects, the UE 506 may determine the time duration for the release timer based on whether a duration of time corresponding to a CDRX is greater than, less than, or equal to a threshold value. In some examples, the UE 506 may include a look-up table stored thereon having a number or range of CDRX durations wherein each CDRX duration or range of durations in the look-up table has a corresponding time duration for a release timer.

For example, during configuration of the RRC connection established in the first step 512, the UE 506 may receive signaling indicating one or more of a first CDRX configuration for the first connection 522 or a second CDRX configuration for the second connection 524 from the first BS 502 (e.g., the MCG). In some examples, the first and/or second CDRX configuration may indicate a CDRX duration. In this case, if the UE 506 determines that the CDRX duration is greater than, less than, or equal to a threshold value, the UE may determine a corresponding duration of the release timer. For example, if, during configuration of the RRC connection, the UE 506 receives signaling indicating that CDRX is not configured for either of the first connection 522 or the second connection 524, then the UE 506 may determine that the time duration for the release timer should be relatively low. In one example, the time duration of the release timer is 30 seconds if neither of the first connection 522 or the second connection 524 is configured with CDRX.

Similarly, if, during configuration of the RRC connection, the UE 506 receives signaling indicating that CDRX is configured for one or both of the first connection 522 or the second connection 524, and the time duration corresponding to the each of the one or both of the CDRX is less than or equal to a first threshold (e.g., 20 milliseconds (ms)), then the UE 506 may determine that the time duration for the release timer should be relatively low. In one example, the time duration of the release timer is 30 seconds if one or both of the first connection 522 or the second connection 524 are configured for a CDRX, and each CDRX has a CDRX duration that is less than or equal to the first threshold. Additionally, the UE 506 may determine the time duration of the release timer is 30 seconds if one of the connections (e.g., the first connection) is configured for a CDRX that is less than the first threshold, and if the other of the connection (e.g., the second connection) is not configured for CDRX.

Alternatively, if, during configuration of the RRC connection, the UE 506 receives signaling indicating that CDRX is configured for the first connection 522 and/or the second connection 524, and the time duration corresponding to only one CDRX is greater than the first threshold, then the UE 506 may determine that the time duration for the release timer should be relatively larger. In one example, the time duration of the release timer is 60 seconds if one or both connections are configured for CDRX and only one CDRX is greater than the first threshold.

In another example, if, during configuration of the RRC connection, the UE 506 receives signaling indicating that CDRX is configured for the first connection 522 and the second connection 524, and the time duration corresponding to the CDRX of each connection is greater than the first threshold, then the UE 506 may determine that the time duration for the release timer should be relatively larger. In one example, the time duration of the release timer is 120 seconds if both connections are configured for CDRX and the CDRX of each connection is greater than the first threshold. It should be noted that the time durations of the release timer in the above examples are exemplary, and any suitable duration of time is within the scope of the disclosure.

In a third step 516, the UE 506 monitors the first connection 522 and the second connection 524 for an opportunity to receive additional downlink data or an opportunity to transmit additional uplink data for the time duration of the release timer. In certain aspects, the UE 506 resets the release timer after receiving downlink data from one or more of the first BS 502 or the second BS 504, or transmitting uplink data, via at least one of the first connection 522 or the second connection 524.

In certain aspects, if the UE 506 determines, for the time duration of the release timer, there is no wireless communication activity between the UE 506 and either of the first BS 502 or the second BS 504 (as shown in FIG. 5 as a fourth step 518), then the UE 506 may proceed to a fifth step 520, where the UE 506 requests release of the RRC connection. That is, if the UE 506 does not detect an opportunity to receive additional downlink data or an opportunity to transmit additional uplink data for the time duration of the release timer, the UE 506 can release the RRC connection to end monitoring of the first connection 522 and the second connection 524 to conserve power.

In certain aspects, the UE 506 requests release from the RRC connection by transmitting a tracking area update (TAU) message to the first BS 502 (e.g., the MCG), wherein the TAU message is configured to trigger the first BS 502 to release the UE from the RRC connection in response to the TAU message. However, in certain cases, the first BS 502 may not release the UE 506. In such cases, the UE 506 may determine that the first BS 502 has not released the RRC connection in response to the TAU message, and cease to release the RRC connection by monitoring the first connection 522 and the second connection 524.

Alternatively, the UE 506 may determine not to cease to release the RRC connection by monitoring the first connection 522 and the second connection 524 in response to the determination that the first BS 502 has not responded to the TAU message. For example, the UE 506 may instead retransmit the TAU message to the first BS 502 N times, wherein N is an integer greater than or equal to one. If the UE 506 determines that the first BS 502 has not released the UE 506 from the RRC connection after N retransmissions of the TAU message, the UE 506 may then cease to release the RRC connection by monitoring the first connection 522 and the second connection 524.

In certain aspects, before releasing the RRC connection, the UE 506 identifies a network type (e.g., public land mobile network (PLMN), public switched telephone network (PSTN), mobility management entity (MME) type, etc.) associated with the RRC connection based on signaling received via one or more of the first connection or the second connection. For example, the UE 506 may receive signaling from the first BS 502 or the second BS 504 that contains an identifier indicative of the network type. Based on the network type, the UE 506 may determine a second time duration corresponding to the identified network type, and disable the release of the RRC connection until after the second time duration.

For example, the UE 506 may determine to continue to monitor the first connection 522 and the second connection 524 despite there being no activity on either of the first connection 522 or the second connection 524, if the UE 506 determines that a network type corresponding to the RRC connection provides for an additional amount of time (e.g., the second time duration) for which the UE 506 can disable the release of the RRC connection. That is, the UE 506 refrains from releasing the RRC connection on its own until after the second time duration. Once the additional amount of time of the second time duration passes, the UE 506 may release the RRC connection on its own by monitoring the first connection 522 and the second connection 524.

In certain aspects, the RRC connection may be subject to various RRC procedures. As noted previously, the first BS 502 may be part of an MCG of a first RAT, and the second BS 504 may be part of an SCG of a second RAT. In some examples, the UE 506 may detect an RRC procedure corresponding to dual-connectivity (e.g., RRC reconfiguration, CDRX reconfiguration, EN-DC reconfiguration, etc.) with the first BS 502 and the second BS 504. In some examples, the RRC procedure may occur during the monitoring the first connection 522 and the second connection 524. In such examples, the UE 506 may suspend the release timer in response to detecting the RRC procedure, then resume the release timer once the UE 506 determines that the RRC procedure is completed.

In another example, the UE 506 may detect an RRC procedure corresponding to dual-connectivity with the first BS 502 and the second BS 504, wherein the RRC procedure occurs during the monitoring the first connection 522 and the second connection 524. In this example, the UE 506 may not suspend the release timer. Instead, if the time duration of the release timer ends during the RRC procedure, the UE 506 may determine to release the RRC connection after the RRC procedure is complete.

In some examples, the RRC procedure may include one or more of a reconfiguration of the RRC connection, a radio link failure (RLF) of one or more of the first connection or the second connection, a handover operation between the first BS and a third BS or the second BS and a fourth BS, a failure of the SCG, an inter-RAT handover between the RAT of the first BS 502 and another RAT, or the RAT of the second BS 504 and another RAT, or a multi subscriber identity module (SIM) tune away.

In certain aspects, the UE 506 may determine not to release the RRC connection after the time duration of the release timer. For example, if the UE 506 expects to receive a downlink communication over one or more of the first connection 522 or the second connection 524, the UE may maintain the RRC connection and continue to monitor the one or more of the first connection 522 or the second connection 524 for the downlink communication for another duration of time. Alternatively, the UE may maintain the RRC connection and continue to monitor the one or more of the first connection 522 or the second connection 524 for an uplink grant for another duration of time, for example, the UE 506 may continue to monitor for an additional 30 seconds to 4 minutes, or in some examples, the same duration as the release timer.

In certain aspects, the UE 506 may receive an RRC reconfiguration message indicating that one or more of the first BS 502 or the second BS 504 will want to begin communicating with the UE 506. In such an example, the UE 506 may determine not to release the RRC connection after the time duration of the release timer, and may instead continue to monitor the first connection 522 and the second connection 524 for a duration of time after the release timer. In some examples the UE 506 may continue to monitor for an additional 30 seconds to 4 minutes, or in some examples, the same duration as the release timer.

In some examples, the UE 506 may determine a pattern of application layer data traffic over the RRC connection. Based on this pattern, the UE 506 may determine not to release the RRC connection after the release timer. Instead, the UE 506 may continue to monitor the RRC connection for an additional duration of time based on the pattern of application layer data traffic over one or more of the first connection or the second connection. For example, if the UE 506 detects that the application layer data traffic can sometimes require a particular duration, the UE 506 may continue to monitor the first connection and the second connection for that duration.

In certain aspects, the UE 506 may determine to release only one of the first connection 522 or the second connection 524 after the release timer. For example, if the UE 506 does not detect activity on the second connection associated with the 5G NR RAT during the duration of the release timer, the UE 506 may determine to release only the second connection while maintaining the first connection associated with the LTE RAT.

Example of a UE Releasing a Radio Resource Control (RRC) Connection in a Standalone (SA) New Radio (NR) Communication Aspects of the present disclosure provide methods allowing a UE (e.g., UE 120*a* of FIG. 1) to release or drop an RRC connection with a BS (e.g., BS 110*a*) so that the UE 120*a* can conserve power that would otherwise be drained if the UE 120*a* remained in a connected state.

Figure 6:
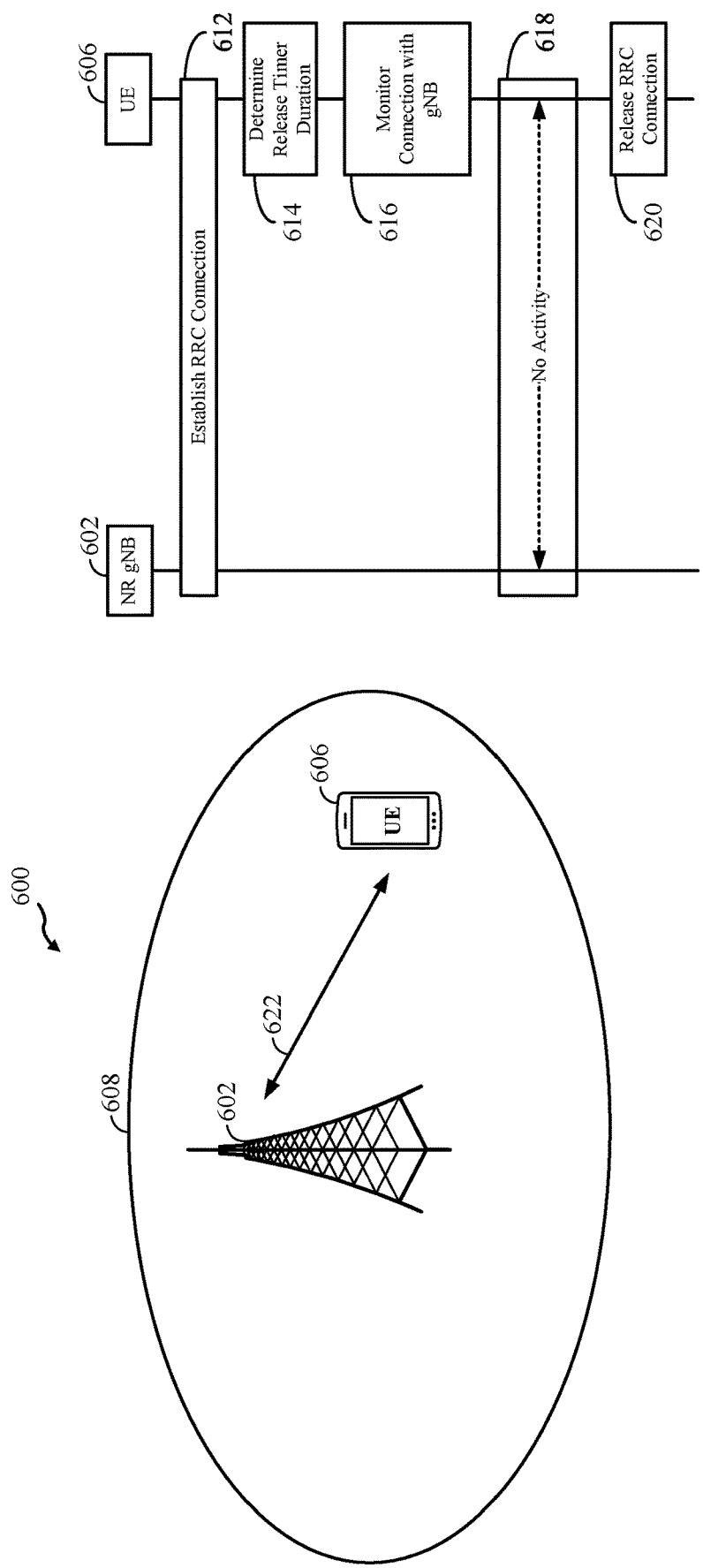
FIG. 6 includes a diagram and a call-flow diagram illustrating an example method for releasing an RRC connection within a standalone (SA) network, in accordance with certain aspects of the present disclosure.

FIG. 6 includes a diagram and a call-flow diagram illustrating an example method for releasing an RRC connection 622 within an SA network 600, according to certain aspects. In this example, the SA network 600 includes a BS 602 (e.g., BS 110*a* of FIG. 1) utilizing a 5G NR RAT (e.g., next generation BS (gNB)) for communication within a NR 5G cell 608. Within the SA network 600, a UE 606 is configured to communicate with the BS 602.

In a first step 612, the UE 606 establishes an RRC connection with the BS 602. In one example, the UE 606 performs an RRC connection process to establish an RRC connection 622 with the BS 602.

In a second step 614, the UE 606 determines a time duration for a release timer, wherein the time duration is based on a cycle length of a connected mode discontinuous reception (CDRX) configuration of the RRC connection 622. In certain aspects, the UE 606 may determine the time duration for the release timer based on whether a duration of time corresponding to the CDRX is greater than, less than, or equal to a threshold value. In some examples, the UE 606 may include a look-up table having a number or range of CDRX durations wherein each CDRX duration or range of durations in the look-up table has corresponding time duration for a release timer. The UE 606 may store the look-up table in a digital storage or memory.

For example, during configuration of the RRC connection established in the first step 612, the UE 606 may receive signaling indicating a CDRX configuration for the RRC connection 622 from the BS 602. In some examples, the CDRX configuration may indicate a duration of the CDRX. In this case, if the UE 606 determines that the duration of the CDRX is greater than, less than, or equal to a threshold value, the UE may determine a corresponding duration of the release timer. For example, if, during configuration of the RRC connection 622, the UE 606 receives signaling indicating that CDRX is not configured for the RRC connection 622, then the UE 606 may determine that the time duration for the release timer should be relatively low (e.g., 60 seconds).

Similarly, if, during configuration of the RRC connection 622, the UE 606 receives signaling indicating that CDRX is configured for the RRC connection 622, and the time duration corresponding to the CDRX is less than or equal to a first threshold (e.g., 20 milliseconds (ms)), then the UE 606 may determine that the time duration for the release timer should be relatively low. In one example, the time duration of the release timer is 60 seconds if the RRC connection 622 is configured for a CDRX that has a duration that is less than or equal to the first threshold.

Alternatively, if, during configuration of the RRC connection 622, the UE 606 receives signaling indicating that CDRX is configured for the RRC connection 622, and the time duration corresponding to the CDRX is greater than the first threshold, then the UE 606 may determine that the time duration for the release timer should be relatively larger. In one example, the time duration of the release timer is 120 seconds if CDRX is greater than the first threshold. It should be noted that the time durations of the release timer in the above examples are exemplary, and any suitable duration of time is within the scope of the disclosure.

In a third step 616, the UE 606 monitors the RRC connection 622 for an opportunity to receive additional downlink data or an opportunity to transmit additional uplink data for the time duration of the release timer. In certain aspects, the UE 606 is configured to reset the release timer after receiving downlink data from the BS 602, or transmitting uplink data, via the RRC connection 622.

In certain aspects, if, for the time duration of the release timer, the UE 606 determines there is no wireless communication activity between the UE 606 and the BS 602 (as shown in FIG. 6 as a fourth step 618), then the UE 606 may proceed to a fifth step 620, where the UE 606 requests release of the RRC connection. That is, if the UE 606 does not detect an opportunity to receive additional downlink data or an opportunity to transmit additional uplink data for the time duration of the release timer, the UE 606 can release the RRC connection to end monitoring of the RRC connection 622 to conserve power.

In certain aspects, the UE 606 requests release from the RRC connection by transmitting a registration update (RU) message to the BS 602, wherein the RU message is configured to trigger the BS 602 to release the UE from the RRC connection in response to the RU message. However, in certain cases, the BS 602 may not release the UE 606. In such cases, the UE 606 may determine that the BS 602 has not released the RRC Connection in response to the RU message, and determine to cease monitoring the RRC connection 622.

Alternatively, the UE 606 may determine not to cease monitoring the RRC connection 622 in response to the determination that the BS 602 has not responded to the RU message. For example, the UE 606 may instead retransmit the RU message to the BS 602 N times, wherein N is an integer greater than or equal to one. If the UE 606 determines that the BS 602 has not released the UE 606 from the RRC connection 622 after N retransmissions of the RU message, the UE 606 may then cease monitoring the RRC connection 622.

In certain aspects, before releasing the RRC connection, the UE 606 may identify a network type (e.g., public land mobile network (PLMN), public switched telephone network (PSTN), mobility management entity (MME) type, etc.) associated with the RRC connection 622 based on signaling received via the RRC connection 622. For example, the UE 606 may receive signaling from the BS 602 that contains an identifier indicative of the network type. Based on the network type, the UE 606 may determine a second time duration corresponding to the identified network type, and disable the release of the RRC connection until after the second time duration, wherein the second time duration contiguously follows the first time duration.

For example, the UE 606 may determine to continue to monitor the RRC connection 622 despite there being no communication activity and after the release timer has expired if the UE 606 determines that a network type corresponding to the RRC connection provides for an additional amount of time (e.g., the second time duration) before the UE 606 can release the RRC connection. That is, the UE 606 refrains from releasing the RRC connection on its own until after the second time duration. Once the additional amount of time of the second time duration passes without there being any additional activity on the RRC connection 622, the UE 606 may release the RRC connection 622 on its own and/or cease monitoring the RRC connection 622.

In certain aspects, the RRC connection 622 may be subject to various RRC procedures. In some examples, the UE 606 may detect an RRC procedure initiated by the BS 602. In some examples, the RRC procedure may occur during the monitoring the RRC connection 622. In such examples, the UE 606 may suspend the release timer in response to detecting the RRC procedure, then resume the release timer once the UE 606 determines that the RRC procedure is completed.

In another example, the UE 606 may detect an RRC procedure, wherein the RRC procedure occurs during the monitoring the RRC connection 622. In this example, the UE 606 may not suspend the release timer. Instead, if the time duration of the release timer ends during the RRC procedure, the UE 606 may determine to release the RRC connection after the RRC procedure is complete.

In some examples, the RRC procedure may include one or more of a reconfiguration of one or more of the RRC connection or the CDRX configuration, a radio link failure (RLF) of the RRC connection, a handover operation between the BS and another BS, an inter-RAT handover, or a multi subscriber identity module (SIM) tune away.

In certain aspects, the UE 606 may determine not to release the RRC connection 622 after the time duration of the release timer. For example, if the UE 606 expects to receive a downlink communication over the RRC connection 622, the UE may maintain and continue to monitor the RRC connection 622 for the downlink communication for another duration of time. Alternatively, the UE may maintain and monitor the RRC connection 622 for an uplink grant for another duration of time. For example, the UE 606 may continue to monitor for an additional 30 seconds to 4 minutes, or in some examples, for the same duration as the release timer.

In certain aspects, the UE 606 may receive an RRC reconfiguration message indicating that the BS 602 will want to begin communicating with the UE 606. In such an example, the UE 606 may determine not to release the RRC connection 622 after the time duration of the release timer, and may instead continue to monitor the RRC connection 622 for a duration of time after the release timer. In some examples the UE 606 may continue to monitor for an additional 30 seconds to 4 minutes, or in some examples, the same duration as the release timer.

Figure 7:
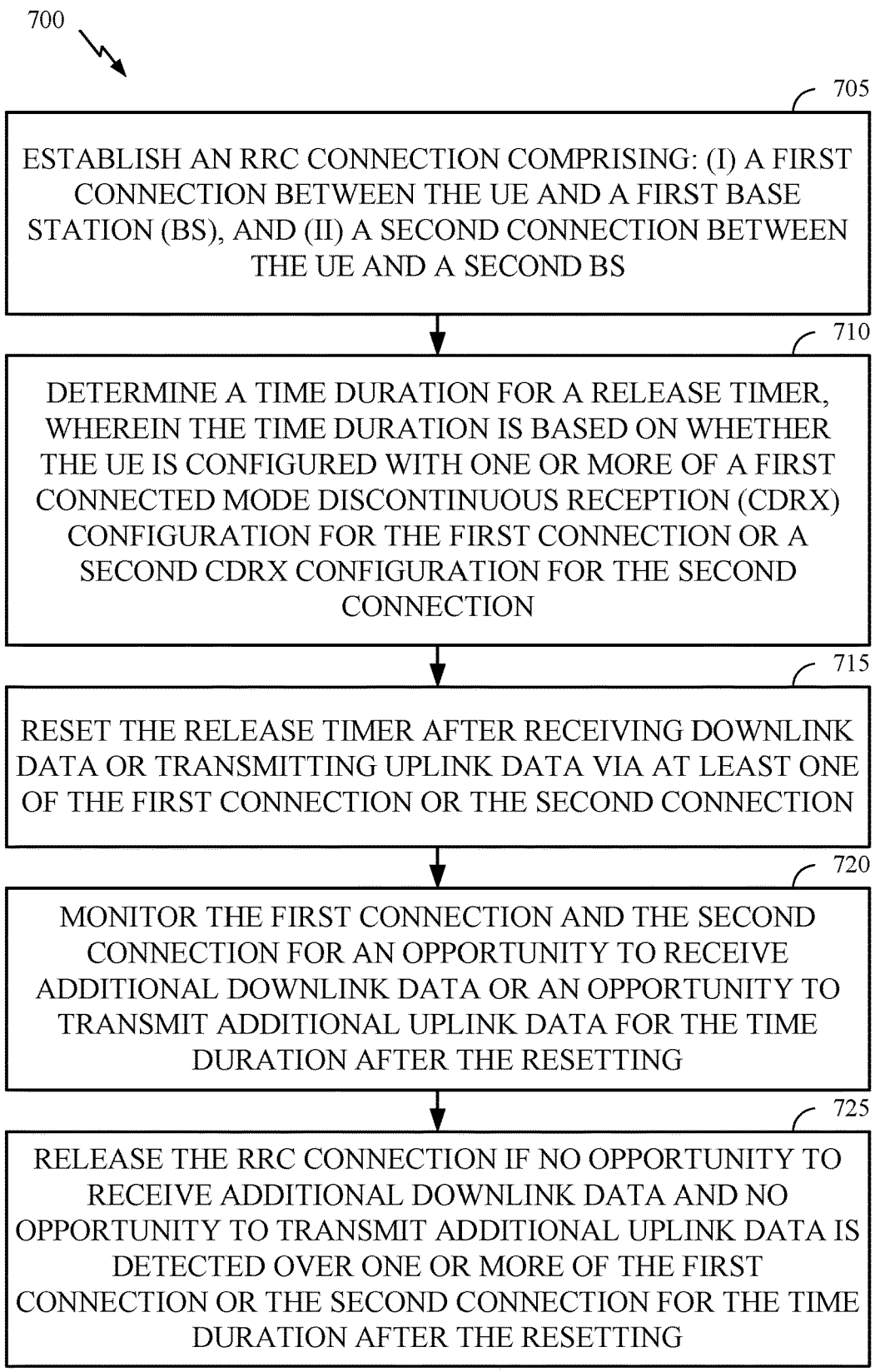
FIG. 7 is a flow diagram illustrating example operations for wireless communication, in accordance with certain aspects of the present disclosure.

FIG. 7 is a flow diagram illustrating example operations 700 for wireless communication, in accordance with certain aspects of the present disclosure. The operations 700 may be performed, for example, by UE (e.g., such as a UE 120*a* in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 705, by establishing an RRC connection comprising: (i) a first connection between the UE and a first base station (BS), and (ii) a second connection between the UE and a second BS.

The operations 700 may proceed, at block 710, by determining a time duration for a release timer, wherein the time duration is based on whether the UE is configured with one or more of a first connected mode discontinuous reception (CDRX) configuration for the first connection or a second CDRX configuration for the second connection.

The operations 700 may proceed, at block 715, by resetting the release timer after receiving downlink data or transmitting uplink data via at least one of the first connection or the second connection.

The operations 700 may proceed, at block 720, by monitoring the first connection and the second connection for an opportunity to receive additional downlink data or an opportunity to transmit additional uplink data for the time duration after the resetting.

The operations 700 may proceed, at block 725, by releasing the RRC connection if no opportunity to receive additional downlink data and no opportunity to transmit additional uplink data is detected over one or more of the first connection or the second connection for the time duration after the resetting.

In certain aspects, the time duration is further based on one or more of a first cycle duration of the first CDRX configuration or a second cycle duration of the second CDRX configuration.

In certain aspects, if the UE is not configured with the first CDRX configuration and not configured with the second CDRX configuration, the operations 800 include determining the time duration to be a first value. In certain aspects, if the UE is configured with one or more of the first CDRX configuration and the second CDRX configuration and the one or more of the first CDRX configuration and the second CDRX configuration has a cycle length less than a threshold, the operations 700 include determining the time duration to be the first value. In certain aspects, if the UE is configured with one or more of the first CDRX configuration and the second CDRX configuration and only one of the first CDRX configuration and the second CDRX configuration has a cycle length greater than the threshold, the operations 700 include determining the time duration to be a second value that is greater than the first value. In certain aspects, if the UE is configured with both the first CDRX configuration and the second CDRX configuration and both the first CDRX configuration and the second CDRX configuration has a cycle length greater than the threshold, the operations include determining the time duration to be a third value that is greater than the second value.

In certain aspects, the operations 700 include receiving additional downlink data transmitted to the UE during the time duration after the resetting, and resetting the release timer in response to receiving the additional downlink data.

In certain aspects, the operations 700 include transmitting additional uplink data over one or more of the first connection or the second connection during the time duration after the resetting, and resetting the release timer in response to transmitting the additional uplink data.

In certain aspects, the first BS is an evolved Node B (eNB) configured for evolved universal terrestrial radio access network (E-UTRAN), and the second BS is a next generation Node B (gNB) configured for new radio.

In certain aspects, releasing the RRC connection comprises transmitting a tracking area update (TAU) message to the first BS, wherein the TAU message is configured to trigger the first BS to release the UE from the RRC connection in response to the TAU message, determining that the first BS has not released the RRC Connection in response to the TAU message, and disabling release of the RRC connection in response to the determination that the first BS has not responded to the TAU message.

In certain aspects, disabling the release of the RRC connection comprises retransmitting the TAU message to the first BS N times, wherein N is an integer greater than or equal to one, and determining that the first BS has not released the UE from the RRC connection in response to each of the N retransmissions of the TAU message.

In certain aspects, the time duration is a first time duration, and wherein disabling the release of the RRC connection comprises identifying a network type associated with the RRC connection based on signaling received via one or more of the first connection or the second connection, determining a second time duration corresponding to the identified network type, and disabling the release of the RRC connection for the second time duration, wherein the second time duration contiguously follows the first time duration.

In certain aspects, wherein the first BS is part of a master cell group (MCG) of a first radio access technology (RAT), and wherein the second BS is part of a secondary cell group (SCG) of a second RAT.

In certain aspects, the operations 700 include detecting an RRC procedure corresponding to dual-connectivity with the first BS and the second BS, wherein the RRC procedure occurs during the monitoring the first connection and the second connection, suspending the release timer in response to detecting the RRC procedure, determining that the RRC procedure is completed, and resuming the release timer in response to the determination that the RRC procedure is completed.

In certain aspects, the operations 700 include detecting an RRC procedure corresponding to dual-connectivity with the first BS and the second BS, wherein the RRC procedure occurs during the monitoring the first connection and the second connection, and if the time duration ends after the resetting during the RRC procedure, releasing one or more of the first connection or the second connection after a determination that the RRC procedure is completed.

In certain aspects, the RRC procedure comprises at least one of a reconfiguration of the RRC connection, a radio link failure (RLF) of one or more of the first connection or the second connection, a handover operation between the first BS and a third BS or the second BS and a fourth BS, a failure of the SCG, an inter-RAT handover between the first RAT and a third RAT or the second RAT and a fourth RAT, or a multi subscriber identity module (SIM) tune away.

In certain aspects, the time duration is a first time duration, and wherein releasing the RRC connection further comprises determining to release the RRC connection after both the first time duration and a second time duration that contiguously follows the first time duration.

In certain aspects, determining to release the RRC connection after both the first time duration and the second time duration is based on an expectation of receiving an uplink grant during the second time duration.

In certain aspects, the operations 700 include receiving an RRC reconfiguration message from one or more of the first BS or the second BS, wherein determining to release the RRC connection after both the first time duration and the second time duration is based on receipt of the RRC reconfiguration message.

In certain aspects, the second time duration is equal to the first time duration, and wherein the second time duration is a result of restarting the release timer after the first time duration after the resetting.

In certain aspects, determining a time duration for the release timer further comprises determining a pattern of application layer data traffic over the RRC connection, wherein the time duration is further based on the pattern of application layer data traffic over one or more of the first connection or the second connection.

Figure 8:
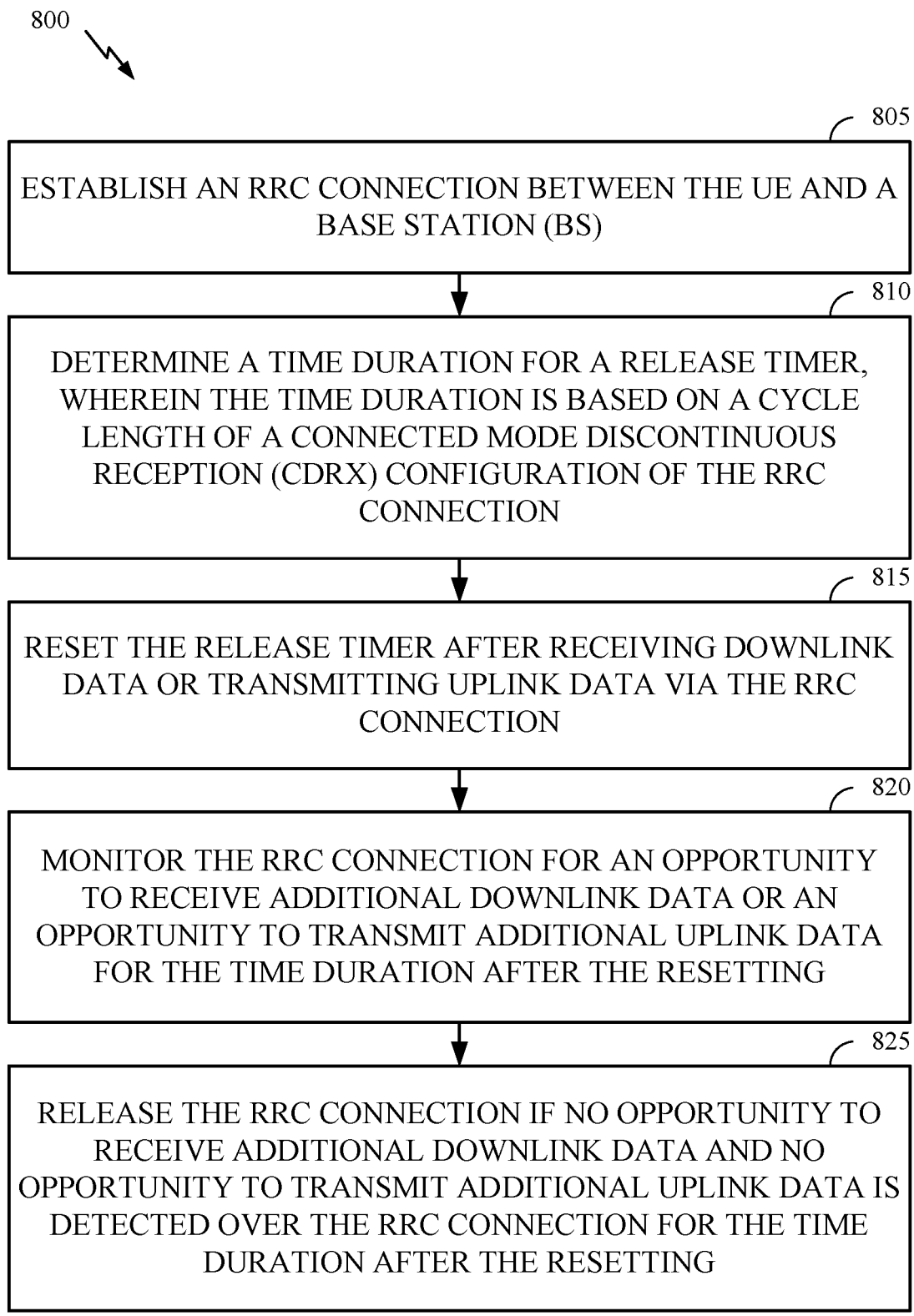
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by UE (e.g., such as a UE 120a in the wireless communication network 100). Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin, at block 805, by establishing an RRC connection between the UE and a base station (BS).

The operations 800 may proceed at block 810, by determining a time duration for a release timer, wherein the time duration is based on a cycle length of a connected mode discontinuous reception (CDRX) configuration of the RRC connection.

The operations 800 may proceed at block 815, by resetting the release timer after receiving downlink data or transmitting uplink data via the RRC connection.

The operations 800 may proceed at block 820, by monitoring the RRC connection for an opportunity to receive additional downlink data or an opportunity to transmit additional uplink data for the time duration after the resetting.

The operations 800 may proceed at block 825, by releasing the RRC connection if no opportunity to receive additional downlink data and no opportunity to transmit additional uplink data is detected over the RRC connection for the time duration after the resetting.

In certain aspects, the time duration is further based on a cycle duration of the CDRX configuration.

In certain aspects, if the UE is not configured with the CDRX configuration, the operations 800 include determining the time duration to be a first value. In certain aspects, if the UE is configured with the CDRX configuration and the CDRX configuration has a cycle length less than a threshold, the operations 800 include determining the time duration to be the first value. In certain aspects, if the UE is configured with the CDRX configuration, and the CDRX configuration has a cycle length greater than the threshold, the operations 800 include determining the time duration to be a second value that is greater than the first value.

In certain aspects, the operations 800 include receiving additional downlink data transmitted to the UE during the time duration after the resetting, and resetting the release timer in response to receiving the additional downlink data.

In certain aspects, the BS is a next generation Node B (gNB) configured for new radio.

In certain aspects, releasing the RRC connection comprises transmitting a registration update (RU) message to the BS, wherein the RU message is configured to trigger the BS to release the UE from the RRC connection in response to the RU message, determining that the BS has not responded to the RU message, and disabling release of the RRC connection in response to the determination that the BS has not responded to the RU message.

In certain aspects, the time duration is a first time duration, and wherein disabling the release of the RRC connection comprises identifying a network type associated with the RRC connection based on signaling received via the RRC connection, and determining a second time duration corresponding to the identified network type, and disabling the release of the RRC connection for the second time duration, wherein the second time duration contiguously follows the first time duration.

In certain aspects, the time duration is a first duration, and wherein determining that the BS has not responded to the RU message comprises determining that the BS has not released the UE from the RRC connection after a second time duration has elapsed since transmitting the RU message to the BS.

In certain aspects, the operations 800 include detecting an RRC procedure corresponding to the BS, wherein the RRC procedure occurs during the monitoring the RRC connection, suspending the release timer in response to detecting the RRC procedure, determining that the RRC procedure is completed, and resuming the release timer in response to the determination that the RRC procedure is completed.

In certain aspects, the operations include detecting an RRC procedure corresponding to with the BS, wherein the RRC procedure occurs during the monitoring the RRC connection, and if the time duration ends after the resetting during the RRC procedure, releasing the RRC connection after a determination that the RRC procedure is completed.

In certain aspects, the RRC procedure comprises at least one of a reconfiguration of one or more of the RRC connection or the CDRX configuration, a radio link failure (RLF) of the RRC connection, a handover operation between the BS and another BS, an inter-RAT handover, or a multi subscriber identity module (SIM) tune away.

In certain aspects, the time duration is a first time duration, and wherein releasing the RRC connection further comprises determining to release the RRC connection after both the first time duration and a second time duration that contiguously follows the first time duration.

In certain aspects, determining to release the RRC connection after both the first time duration and the second time duration is based on an expectation of receiving an uplink grant during the second time duration.

In certain aspects, the operations include receiving an RRC reconfiguration message from the BS, wherein determining to release the RRC connection after both the first time duration and the second time duration is based on receipt of the RRC reconfiguration message.

In certain aspects, the second time duration is equal to the first time duration, and wherein the second time duration is a result of restarting the release timer after the first time duration after the resetting.

In certain aspects, the determining a time duration for the release timer further comprises determining a pattern of application layer data traffic over the RRC connection, wherein the time duration is further based on the pattern of application layer data traffic over the RRC connection.

Figure 9:
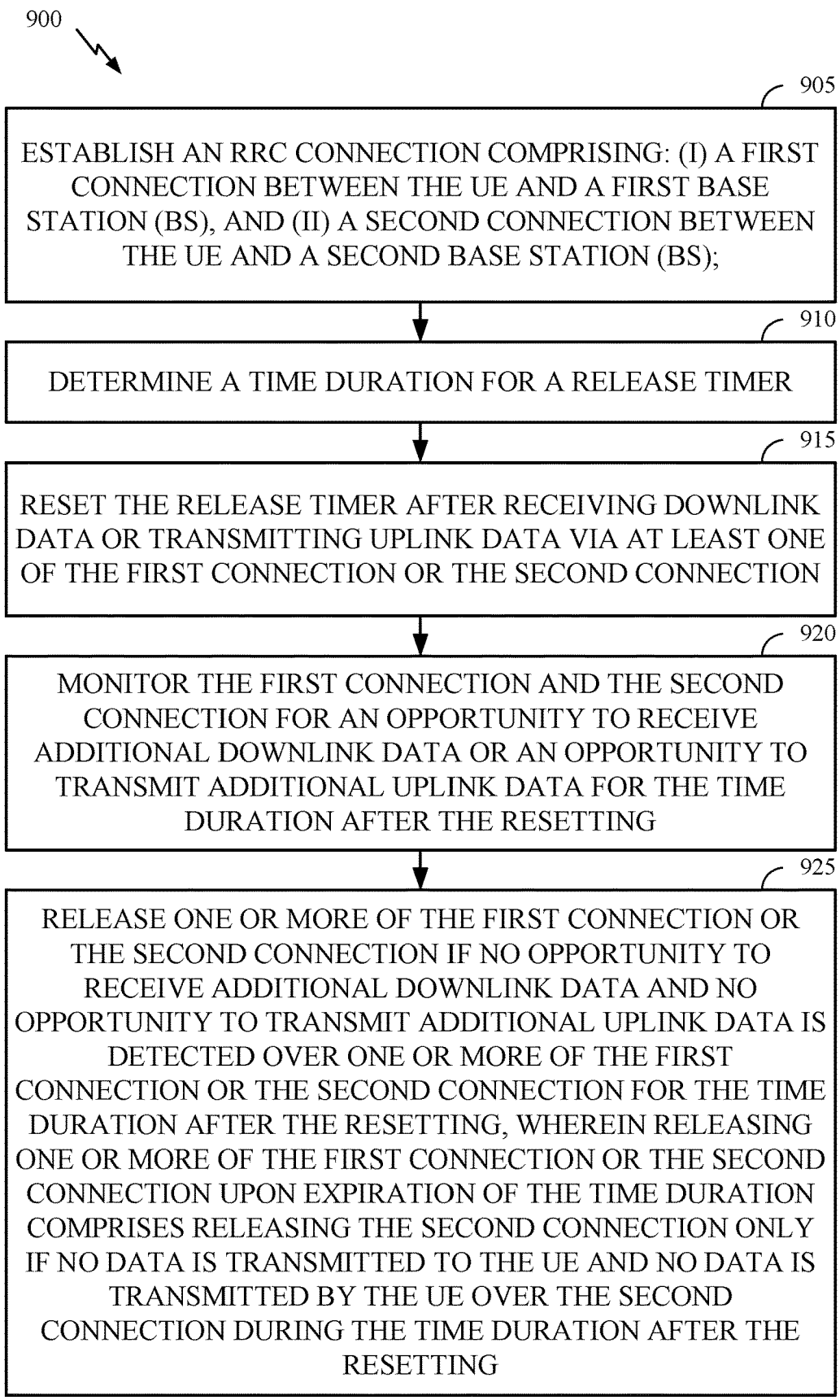
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed, for example, by UE (e.g., such as a UE 120a in the wireless communication network 100). Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at block 905, by establishing an RRC connection comprising: (i) a first connection between the UE and a first base station (BS), and (ii) a second connection between the UE and a second BS.

The operations 900 may proceed at block 910, by determining a time duration for a release timer.

The operations 900 may proceed at block 915, by resetting the release timer after receiving downlink data or transmitting uplink data via at least one of the first connection or the second connection.

The operations 900 may proceed at block 920, by monitoring the first connection and the second connection for an opportunity to receive additional downlink data or an opportunity to transmit additional uplink data for the time duration after the resetting.

The operations 900 may proceed at block 925, by releasing one or more of the first connection or the second connection if no opportunity to receive additional downlink data and no opportunity to transmit additional uplink data is detected over one or more of the first connection or the second connection for the time duration after the resetting, wherein releasing one or more of the first connection or the second connection upon expiration of the time duration comprises releasing the second connection only if no data is transmitted to the UE and no data is transmitted by the UE over the second connection during the time duration after the resetting.

Figure 10:
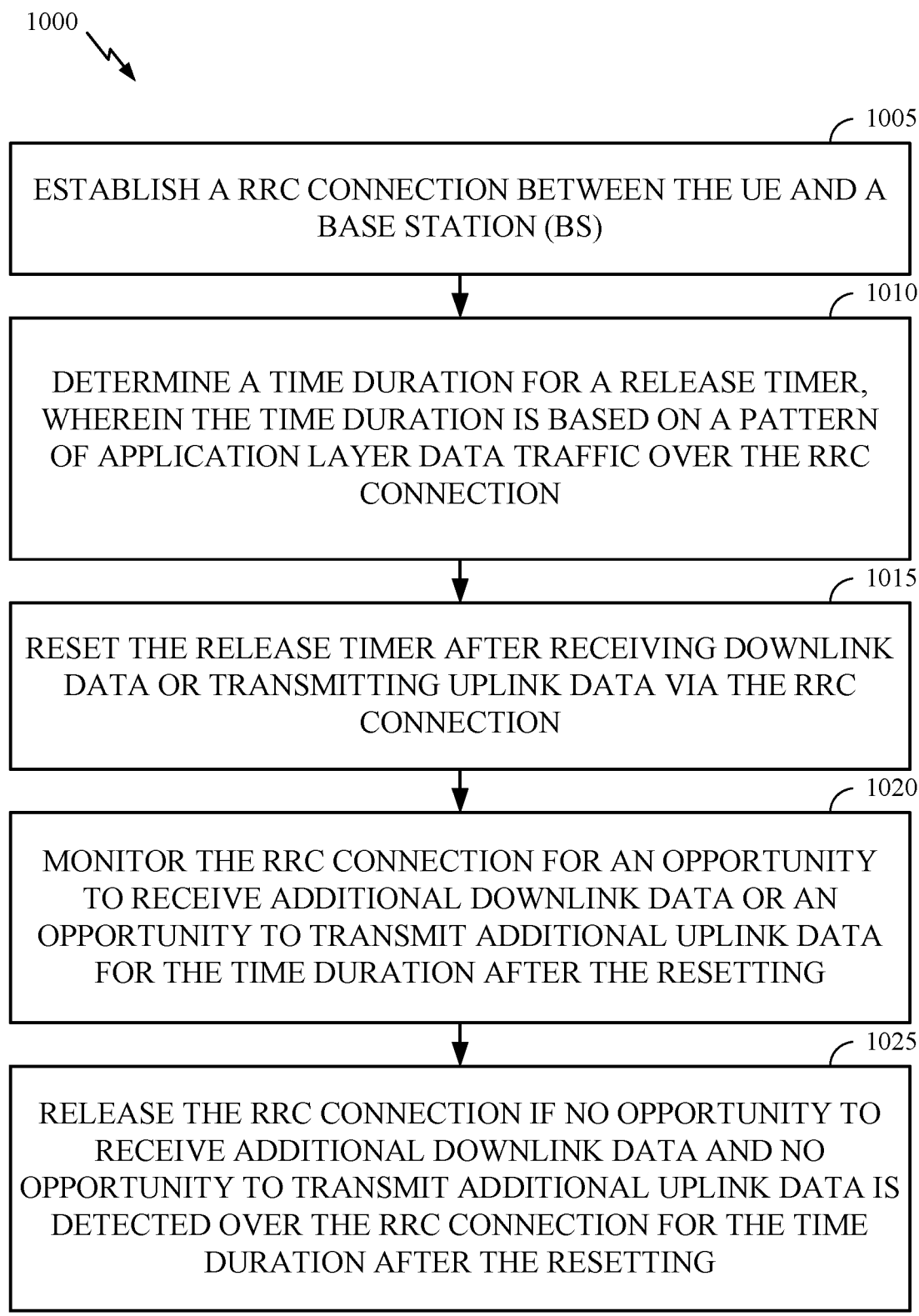
FIG. 10 is a flow diagram illustrating example operations for wireless communication, in accordance with certain aspects of the present disclosure.

FIG. 10 is a flow diagram illustrating example operations 1000 for wireless communication, in accordance with certain aspects of the present disclosure. The operations 1000 may be performed, for example, by UE (e.g., such as a UE 120a in the wireless communication network 100). Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at block 1005, by establishing a RRC connection between the UE and a base station (BS).

The operations 1000 may proceed at block 1010, by determining a time duration for a release timer, wherein the time duration is based on a pattern of application layer data traffic over the RRC connection.

The operations 1000 may proceed at block 1015, by resetting the release timer after receiving downlink data or transmitting uplink data via the RRC connection.

The operations 1000 may proceed at block 1020, by monitoring the RRC connection for an opportunity to receive additional downlink data or an opportunity to transmit additional uplink data for the time duration after the resetting.

The operations 1000 may proceed at block 1025, by releasing the RRC connection if no opportunity to receive additional downlink data and no opportunity to transmit additional uplink data is detected over the RRC connection for the time duration after the resetting.

Figure 11:
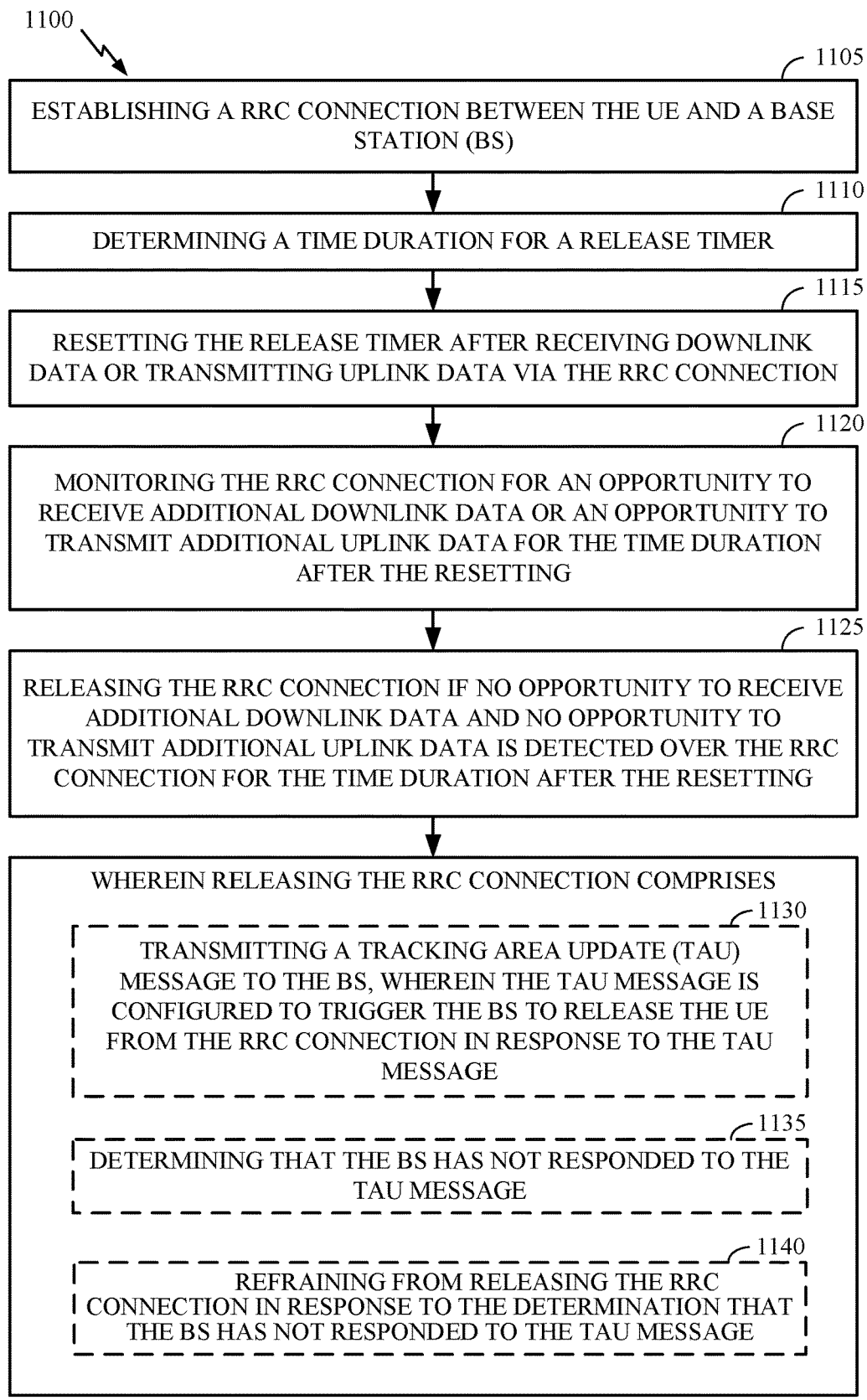
FIG. 11 is a flow diagram illustrating example operations for wireless communication, in accordance with certain aspects of the present disclosure.

FIG. 11 is a flow diagram illustrating example operations 1100 for wireless communication, in accordance with certain aspects of the present disclosure. The operations 1100 may be performed, for example, by UE (e.g., such as a UE 120a in the wireless communication network 100). Operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at block 1105, by establishing a RRC connection between the UE and a base station (BS).

The operations 1100 may proceed at block 1110, by determining a time duration for a release timer.

The operations 1100 may proceed at block 1115, by resetting the release timer after receiving downlink data or transmitting uplink data via the RRC connection.

The operations 1100 may proceed at block 1120, by monitoring the RRC connection for an opportunity to receive additional downlink data or an opportunity to transmit additional uplink data for the time duration after the resetting.

The operations 1100 may proceed at block 1125, by releasing the RRC connection if no opportunity to receive additional downlink data and no opportunity to transmit additional uplink data is detected over the RRC connection for the time duration after the resetting. In certain aspects, releasing the RRC connection comprises block 1130: transmitting a registration update (RU) message to the BS, wherein the RU message is configured to trigger the BS to release the UE from the RRC connection in response to the RU message. In certain aspects, releasing the RRC connection comprises block 1135: determining that the BS has not responded to the RU message. In certain aspects, releasing the RRC connection comprises block 1140: refraining from releasing the RRC connection in response to the determination that the BS has not responded to the RU message.

Figure 12:
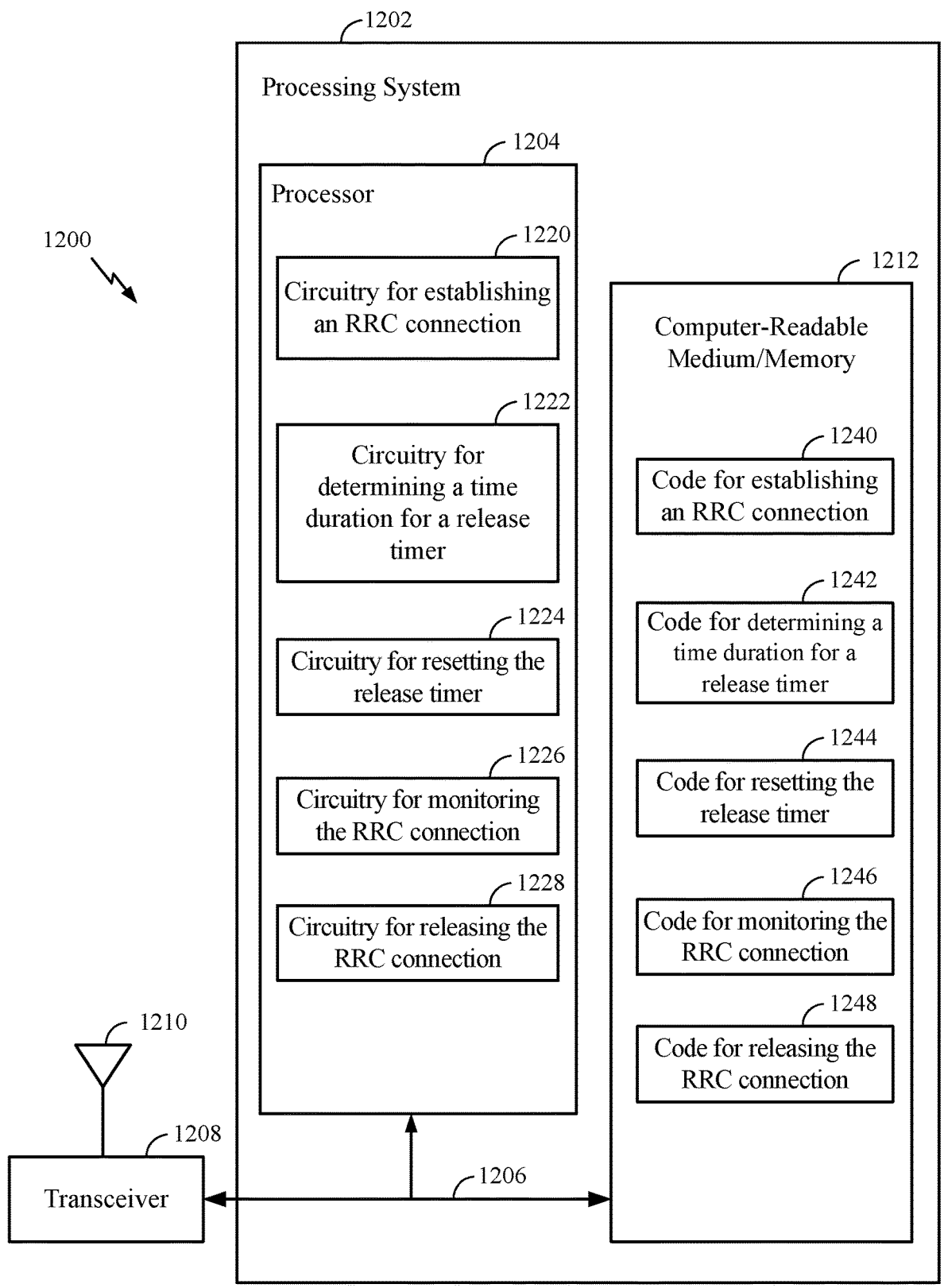
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIGS. 7-11. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 7-11, or other operations for performing the various techniques discussed herein for releasing an RRC connection. In certain aspects, computer-readable medium/memory 1212 stores code 1240 for establishing an RRC connection; code 1242 for determining a time duration for a release timer; code 1244 for resetting the release timer; code 1246 for monitoring the RRC connection; code 1248 for releasing the RRC connection. In certain aspects, the processor 1204 has circuitry configured to implement the code stored in the computer-readable medium/memory 1212. The processor 1204 includes circuitry 1220 for establishing an RRC connection; circuitry 1222 for determining a time duration for a release timer; circuitry 1224 for resetting the release timer; circuitry 1226 for monitoring the RRC connection; circuitry 1228 for releasing the RRC connection.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable storage medium (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of releasing a radio resource control (RRC) connection by a user equipment (UE), comprising:
    establishing an RRC connection comprising: (i) a first connection between the UE and a first base station (BS), and (ii) a second connection between the UE and a second BS;
    determining a time duration for a release timer, wherein the time duration is based on whether the UE is configured with one or more of a first connected mode discontinuous reception (CDRX) configuration for the first connection or a second CDRX configuration for the second connection, and wherein a value of the time duration for the release timer that is based on the UE not being configured with the first CDRX configuration and the second CDRX configuration is different from a value of the time duration for the release timer that is based on the UE being configured with at least one of the first CDRX configuration or the second CDRX configuration;
    resetting the release timer after receiving downlink data or transmitting uplink data via at least one of the first connection or the second connection;
    monitoring the first connection and the second connection for an opportunity to receive additional downlink data or an opportunity to transmit additional uplink data for the time duration after the resetting; and
    releasing the RRC connection if no opportunity to receive additional downlink data and no opportunity to transmit additional uplink data is detected over one or more of the first connection or the second connection for the time duration after the resetting.

2. The method of claim 1, wherein the time duration is further based on one or more of a first cycle duration of the first CDRX configuration or a second cycle duration of the second CDRX configuration.

3. The method of claim 2, further comprising:
    if the UE is not configured with the first CDRX configuration and not configured with the second CDRX configuration, determining the time duration to be a first value;
    if the UE is configured with one or more of the first CDRX configuration and the second CDRX configuration and the one or more of the first CDRX configuration and the second CDRX configuration has a cycle length less than a threshold, determining the time duration to be the first value;
if the UE is configured with one or more of the first CDRX configuration and the second CDRX configuration and only one of the first CDRX configuration and the second CDRX configuration has a cycle length greater than the threshold, determining the time duration to be a second value that is greater than the first value; and
if the UE is configured with both the first CDRX configuration and the second CDRX configuration and both the first CDRX configuration and the second CDRX configuration has a cycle length greater than the threshold, determining the time duration to be a third value that is greater than the second value.

4. The method of claim 1, further comprising:
receiving additional downlink data transmitted to the UE during the time duration after the resetting; and
resetting the release timer in response to receiving the additional downlink data.

5. The method of claim 1, further comprising:
transmitting additional uplink data over one or more of the first connection or the second connection during the time duration after the resetting; and
resetting the release timer in response to transmitting the additional uplink data.

6. The method of claim 1, wherein the first BS is an evolved Node B (eNB) configured for evolved universal terrestrial radio access network (E-UTRAN), and wherein the second BS is a next generation Node B (gNB) configured for new radio.

7. The method of claim 1, wherein releasing the RRC connection comprises:
transmitting a tracking area update (TAU) message to the first BS, wherein the TAU message is configured to trigger the first BS to release the UE from the RRC connection in response to the TAU message;
determining that the first BS has not released the RRC Connection in response to the TAU message; and
disabling release of the RRC connection in response to the determination that the first BS has not responded to the TAU message.

8. The method of claim 7, wherein disabling the release of the RRC connection comprises:
retransmitting the TAU message to the first BS N times, wherein N is an integer greater than or equal to one; and
determining that the first BS has not released the UE from the RRC connection in response to each of the N retransmissions of the TAU message.

9. The method of claim 7, wherein the time duration is a first time duration, and wherein disabling the release of the RRC connection comprises:
identifying a network type associated with the RRC connection based on signaling received via one or more of the first connection or the second connection;
determining a second time duration corresponding to the identified network type; and
disabling the release of the RRC connection for the second time duration, wherein the second time duration contiguously follows the first time duration.

10. The method of claim 1, wherein the first BS is part of a master cell group (MCG) of a first radio access technology (RAT), and wherein the second BS is part of a secondary cell group (SCG) of a second RAT.

11. The method of claim 10, further comprising:
detecting an RRC procedure corresponding to dual-connectivity with the first BS and the second BS, wherein the RRC procedure occurs during the monitoring the first connection and the second connection; and
suspending the release timer in response to detecting the RRC procedure, determining that the RRC procedure is completed, and resuming the release timer in response to the determination that the RRC procedure is completed, or resuming the release timer in response to the determination that the RRC procedure is completed
if the time duration ends after the resetting during the RRC procedure, releasing one or more of the first connection or the second connection after a determination that the RRC procedure is completed.

12. The method of claim 11, wherein the RRC procedure comprises at least one of:
a reconfiguration of the RRC connection;
a radio link failure (RLF) of one or more of the first connection or the second connection;
a handover operation between the first BS and a third BS or the second BS and a fourth BS;
a failure of the SCG;
an inter-RAT handover between the first RAT and a third RAT or the second RAT and a fourth RAT; or
a multi subscriber identity module (SIM) tune away.

13. The method of claim 1, wherein the time duration is a first time duration, and wherein releasing the RRC connection further comprises determining to release the RRC connection after both the first time duration and a second time duration that contiguously follows the first time duration.

14. The method of claim 13, wherein determining to release the RRC connection after both the first time duration and the second time duration is based on an expectation of receiving an uplink grant during the second time duration.

15. The method of claim 13, further comprising receiving an RRC reconfiguration message from one or more of the first BS or the second BS, wherein determining to release the RRC connection after both the first time duration and the second time duration is based on receipt of the RRC reconfiguration message.

16. The method of claim 13, wherein the second time duration is equal to the first time duration, and wherein the second time duration is a result of restarting the release timer after the first time duration after the resetting.

17. The method of claim 1, wherein determining a time duration for the release timer further comprises:
determining a pattern of application layer data traffic over the RRC connection,
wherein the time duration is further based on the pattern of application layer data traffic over one or more of the first connection or the second connection.

18. A method of releasing a radio resource control (RRC) connection by a user equipment (UE), comprising:
establishing an RRC connection between the UE and a base station (BS);
determining a time duration for a release timer, wherein a value of the time duration for the release timer that is based on the UE being configured with a connected mode discontinuous reception (CDRX) configuration is different from a value of the time duration for the release timer that is based on the UE not being configured with CDRX configuration, wherein the time duration is based on a cycle length of the CDRX configuration when the UE is configured with the CDRX configuration;
resetting the release timer after receiving downlink data or transmitting uplink data via the RRC connection;

monitoring the RRC connection for an opportunity to receive additional downlink data or an opportunity to transmit additional uplink data for the time duration after the resetting; and releasing the RRC connection if no opportunity to receive additional downlink data and no opportunity to transmit additional uplink data is detected over the RRC connection for the time duration after the resetting.

19. The method of claim 18, wherein releasing the RRC connection comprises:

transmitting a registration update (RU) message to the BS, wherein the RU message is configured to trigger the BS to release the UE from the RRC connection in response to the RU message;

determining that the BS has not responded to the RU message; and disabling release of the RRC connection in response to the determination that the BS has not responded to the RU message.

20. The method of claim 19, wherein the time duration is a first duration, and wherein determining that the BS has not responded to the RU message comprises:

determining that the BS has not released the UE from the RRC connection after a second time duration has elapsed since transmitting the RU message to the BS.

21. The method of claim 18, further comprising:

detecting an RRC procedure corresponding to the BS, wherein the RRC procedure occurs during the monitoring the RRC connection; and suspending the release timer in response to detecting the RRC procedure, determining that the RRC procedure is completed, and resuming the release timer in response to the determination that the RRC procedure is completed, or if the time duration ends after the resetting during the RRC procedure, releasing the RRC connection after a determination that the RRC procedure is completed.

22. The method of claim 21, wherein the RRC procedure comprises at least one of:

a reconfiguration of one or more of the RRC connection or the CDRX configuration;

a radio link failure (RLF) of the RRC connection;

a handover operation between the BS and another BS;

an inter-RAT handover; or a multi subscriber identity module (SIM) tune away.

23. The method of claim 18, wherein the time duration is a first time duration, and wherein releasing the RRC connection further comprises determining to release the RRC connection after both the first time duration and a second time duration that contiguously follows the first time duration.

24. The method of claim 23, wherein determining to release the RRC connection after both the first time duration and the second time duration is based on an expectation of receiving an uplink grant during the second time duration.

25. The method of claim 23, further comprising receiving an RRC reconfiguration message from the BS, wherein determining to release the RRC connection after both the first time duration and the second time duration is based on receipt of the RRC reconfiguration message.

26. The method of claim 23, wherein the second time duration is equal to the first time duration, and wherein the second time duration is a result of restarting the release timer after the first time duration after the resetting.

27. The method of claim 18, wherein determining a time duration for the release timer further comprises:

determining a pattern of application layer data traffic over the RRC connection, wherein the time duration is further based on the pattern of application layer data traffic over the RRC connection.

28. A method of releasing a connection in a dual connectivity network, comprising:

establishing a radio resource control (RRC) connection comprising: (i) a first connection between a user equipment (UE) and a first base station (BS), and (ii) a second connection between the UE and a second BS;

determining a time duration for a release timer, and wherein a value of the time duration for the release timer that is based on the UE being configured with at least one of a first CDRX configuration for the first connection or a second CDRX configuration for the second connection is different from a value of the time duration for the release timer that is based on the UE not being configured with the first CDRX configuration and the second CDRX configuration;

resetting the release timer after receiving downlink data or transmitting uplink data via at least one of the first connection or the second connection;

monitoring the first connection and the second connection for an opportunity to receive additional downlink data or an opportunity to transmit additional uplink data for the time duration after the resetting; and releasing one or more of the first connection or the second connection if no opportunity to receive additional downlink data and no opportunity to transmit additional uplink data is detected over one or more of the first connection or the second connection for the time duration after the resetting, wherein releasing one or more of the first connection or the second connection upon expiration of the time duration comprises releasing the second connection only if no data is transmitted to the UE and no data is transmitted by the UE over the second connection during the time duration after the resetting.

29. A method of releasing a radio resource control (RRC) connection by a user equipment (UE), comprising:

establishing a RRC connection between the UE and a base station (BS);

determining a time duration for a release timer, wherein the time duration is based on a pattern of application layer data traffic over the RRC connection and whether the UE is configured with a connected mode discontinuous reception (CDRX) configuration, and wherein a value of the time duration for the release timer that is based on the UE being configured with the CDRX configuration is different from a value of the time duration for the release timer that is based on the UE not being configured with CDRX configuration;

resetting the release timer after receiving downlink data or transmitting uplink data via the RRC connection;

monitoring the RRC connection for an opportunity to receive additional downlink data or an opportunity to transmit additional uplink data for the time duration after the resetting; and releasing the RRC connection if no opportunity to receive additional downlink data and no opportunity to transmit additional uplink data is detected over the RRC connection for the time duration after the resetting.

30. A method of releasing a radio resource control (RRC) connection by a user equipment (UE), comprising:

establishing a RRC connection between the UE and a base station (BS);

determining a time duration for a release timer, and wherein a value of the time duration for the release timer that is based on the UE being configured with a connected mode discontinuous reception (CDRX) configuration is different from a value of the time duration for the release timer that is based on the UE not being configured with CDRX configuration;

resetting the release timer after receiving downlink data or transmitting uplink data via the RRC connection;

monitoring the RRC connection for an opportunity to receive additional downlink data or an opportunity to transmit additional uplink data for the time duration after the resetting; and releasing the RRC connection if no opportunity to receive additional downlink data and no opportunity to transmit additional uplink data is detected over the RRC connection for the time duration after the resetting, wherein releasing the RRC connection comprises:

transmitting a registration update (RU) message to the BS, wherein the RU message is configured to trigger the BS to release the UE from the RRC connection in response to the RU message;

determining that the BS has not responded to the RU message; and refraining from releasing the RRC connection in response to the determination that the BS has not responded to the RU message.

31. A user equipment (UE), comprising:
one or more memories comprising instructions; and
one or more processors configured to execute the instructions and cause the UE to:
establish a radio resource control (RRC) connection comprising: (i) a first connection between the UE and a first base station (BS), and (ii) a second connection between the UE and a second BS;
determine a time duration for a release timer, wherein the time duration is based on whether the UE is configured with one or more of a first connected mode discontinuous reception (CDRX) configuration for the first connection or a second CDRX configuration for the second connection, and wherein a value of the time duration for the release timer that is based on the UE not being configured with the first CDRX configuration and the second CDRX configuration is different from a value of the time duration for the release timer that is based on the UE being configured with at least one of the first CDRX configuration or the second CDRX configuration;
reset the release timer after receiving downlink data or transmitting uplink data via at least one of the first connection or the second connection;
monitor the first connection and the second connection for an opportunity to receive additional downlink data or an opportunity to transmit additional uplink data for the time duration after the resetting; and
release the RRC connection if no opportunity to receive additional downlink data and no opportunity to transmit additional uplink data is detected over one or more of the first connection or the second connection for the time duration after the resetting.

32. A user equipment (UE), comprising:
means for establishing a radio resource control (RRC) connection comprising: (i) a first connection between the UE and a first base station (BS), and (ii) a second connection between the UE and a second BS;
means for determining a time duration for a release timer, wherein the time duration is based on whether the UE is configured with one or more of a first connected mode discontinuous reception (CDRX) configuration for the first connection or a second CDRX configuration for the second connection, and wherein a value of the time duration for the release timer that is based on the UE not being configured with the first CDRX configuration and the second CDRX configuration is different from a value of the time duration for the release timer that is based on the UE being configured with at least one of the first CDRX configuration or the second CDRX configuration;
means for resetting the release timer after receiving downlink data or transmitting uplink data via at least one of the first connection or the second connection;
means for monitoring the first connection and the second connection for an opportunity to receive additional downlink data or an opportunity to transmit additional uplink data for the time duration after the resetting; and
means for releasing the RRC connection if no opportunity to receive additional downlink data and no opportunity to transmit additional uplink data is detected over one or more of the first connection or the second connection for the time duration after the resetting.

33. A non-transitory computer-readable storage medium having instructions that, when executed by one or more processors of a user equipment (UE), cause the UE to perform a method of wireless communications, comprising:
establishing a radio resource control (RRC) connection comprising: (i) a first connection between the UE and a first base station (BS), and (ii) a second connection between the UE and a second BS;
determining a time duration for a release timer, wherein the time duration is based on whether the UE is configured with one or more of a first connected mode discontinuous reception (CDRX) configuration for the first connection or a second CDRX configuration for the second connection, and wherein a value of the time duration for the release timer that is based on the UE not being configured with the first CDRX configuration and the second CDRX configuration is different from a value of the time duration for the release timer that is based on the UE being configured with at least one of the first CDRX configuration or the second CDRX configuration;
resetting the release timer after receiving downlink data or transmitting uplink data via at least one of the first connection or the second connection;
monitoring the first connection and the second connection for an opportunity to receive additional downlink data or an opportunity to transmit additional uplink data for the time duration after the resetting; and
releasing the RRC connection if no opportunity to receive additional downlink data and no opportunity to transmit additional uplink data is detected over one or more of the first connection or the second connection for the time duration after the resetting.

* * * * *